United States Patent
Tredwell et al.

(10) Patent No.: US 7,619,197 B2
(45) Date of Patent: Nov. 17, 2009

(54) DIGITAL RADIOGRAPHIC IMAGING APPARATUS

(75) Inventors: Timothy J. Tredwell, Fairport, NY (US); Gregory N. Heiler, Hilton, NY (US)

(73) Assignee: Carestream Health, Inc., Rochester, NY (US)

( * ) Notice: Subject to any disclaimer, the term of this patent is extended or adjusted under 35 U.S.C. 154(b) by 0 days.

(21) Appl. No.: 12/025,086

(22) Filed: Feb. 4, 2008

(65) Prior Publication Data
US 2009/0194672 A1 Aug. 6, 2009

(51) Int. Cl.
*H01L 27/00* (2006.01)
(52) U.S. Cl. .................. 250/208.1; 348/241; 348/250
(58) Field of Classification Search .............. 250/208.1; 348/241, 250, 294, 302, 308–312; 327/91, 327/94
See application file for complete search history.

(56) References Cited

U.S. PATENT DOCUMENTS

| | | | | |
|---|---|---|---|---|
| 5,841,126 A | * | 11/1998 | Fossum et al. | 250/208.1 |
| 6,035,013 A | * | 3/2000 | Orava et al. | 250/370.09 |
| 7,075,049 B2 | * | 7/2006 | Rhodes et al. | 250/208.1 |
| 7,088,394 B2 | * | 8/2006 | Rossi et al. | 250/208.1 |
| 7,133,074 B1 | * | 11/2006 | Brehmer et al. | 348/294 |

OTHER PUBLICATIONS

Commonly assigned U.S. Appl. No. 11/487,539, filed Jul. 14, 2006, titled: Apparatus for Asymmetric Dual-Screen Digital Radiography, by John Yorkston et al.
Commonly assigned U.S. Appl. No. 11/613,394, filed Dec. 20, 2006, titled: Imaging Array for Multiple Frame Capture, by Timothy J. Tredwell.
Commonly assigned U.S. Appl. No. 11/553,018, filed Oct. 26, 2006, titled: Metal Substrate Having Electronic Devices Formed Thereon, by Roger Stanley Kerr et al.
Commonly assigned U.S. Appl. No. 11/531,707, filed Sep. 14, 2006, titled: High Fill-Factor Sensor With Reduced Coupling, by Gregory N. Heiler et al.

* cited by examiner

*Primary Examiner*—Seung C Sohn

(57) ABSTRACT

A light sensing array has a plurality of electrically isolated photosensors, each photosensor having a first terminal and a second terminal, each of the terminals of each photosensor being isolated from the terminals of the other photosensors, wherein each photosensor responds to an incident light level by producing a charge difference between the first and second terminal. There is a differential circuit selectively coupled to the first and second terminals of one of the photo sensors for producing an output signal related to the charge difference between the first and second terminals.

25 Claims, 19 Drawing Sheets

DIGITAL RADIOGRAPHIC IMAGING APPARATUS

CROSS-REFERENCE TO RELATED APPLICATIONS

Cross-reference is herein made to the following commonly assigned applications: U.S. Ser. No. 11/487,539, filed Jul. 14, 2006, titled: APPARATUS FOR ASYMMETRIC DUAL-SCREEN DIGITAL RADIOGRAPHY, by John Yorkston et al.; U.S. Ser. No. 11/613,394, filed Dec. 20, 2006, titled: IMAGING ARRAY FOR MULTIPLE FRAME CAPTURE, by Timothy J. Tredwell; U.S. Ser. No. 11/553,018, filed Oct. 26, 2006, titled: METAL SUBSTRATE HAVING ELECTRONIC DEVICES FORMED THEREON, by Roger Stanley Kerr et al.; and, U.S. Ser. No. 11/531,707, filed Sep. 14, 2006, titled: HIGH FILL-FACTOR SENSOR WITH REDUCED COUPLING, by Gregory N. Heiler et al.

FIELD OF THE INVENTION

This invention generally relates to digital radiographic imaging and more particularly relates to an imaging array using differential readout components.

BACKGROUND OF THE INVENTION

A conventional digital radiography (DR) imaging panel acquires image data from a scintillating medium using an array of individual sensors, arranged in a row-by-column matrix, in which each sensor provides a single pixel of image data. Each pixel generally includes a photosensor and a switching element which can be arranged in a planar or a vertical manner, as is generally known in the art. In one known imaging arrangement, a frontplane has an array of photosensitive elements, and a backplane consists of an array of thin-film transistor (TFT) switches. In these imaging devices, hydrogenated amorphous silicon (a-Si:H) is commonly used to form the photodiode and the thin-film transistor switch needed for each pixel, although polycrystalline semiconductors such as laser recrystallized silicon and single-crystal silicon TFT switches can alternately be employed.

FIG. 1 shows a schematic of a portion of a flat panel imager 80 of this conventional type consisting of an array having a number of a-Si:H n-i-p photodiodes 70 and TFTs 71. Gate driver chips 82 connect to the blocks of gate lines 83 and readout chips 34 connect to blocks of data lines 84 and bias lines 85. Charge amplifiers 86 may be provided that receive signals from the data lines. An output from the charge amplifiers 86 may go to an analog multiplexer 87 or directly to an analog-to-digital converter (ADC) 88 to stream out the digital image data at desired rates.

In the conventional a-Si:H-based indirect flat panel imager of FIG. 1, incident X-ray photons are converted to optical photons, which are subsequently converted to electron-hole pairs within the a-Si:H n-i-p photodiodes 70. The pixel charge capacity of the photodiodes is a product of the bias voltage and the photodiode capacitance. In general, a reverse bias voltage is applied to the bias lines 85 to create an electric field (and hence a depletion region) across the photodiodes and enhance charge collection efficiency. The image signal is integrated by the photodiodes while the associated TFTs 71 are held in a non-conducting ("off") state. This is accomplished by maintaining the gate lines 83 at a negative voltage. The array is read out by sequentially switching rows of the TFTs 71 to a conducting state by means of TFT gate control circuitry. When a row of pixels is switched to a conducting ("on") state by applying a positive voltage to the corresponding gate line 83, charge from those pixels is transferred along data lines 84 and integrated by external charge-sensitive amplifiers 86. The row is then switched back to a non-conducting state, and the process is repeated for each row until the entire array has been read out. The signal outputs from the external charge-sensitive amplifiers 86 are transferred to an analog-to-digital converter (ADC) 88 by a parallel-to-serial multiplexer 87, subsequently yielding a digital image.

The flat panel imager having an imaging array as described with reference to FIG. 1 is capable of both single-shot (radiographic) and continuous (fluoroscopic) image acquisition. However, the charge amplifiers of the conventional circuit arrangement are subject to common mode noise and other problems that constrain signal quality.

Also known in the art are digital radiographic imaging panels that utilize an array of pixels comprising an X-ray absorbing photoconductor, such as amorphous Selenium (a-Se), and a readout circuit. Since the X-rays are absorbed in the photoconductor, no separate scintillating screen is required.

These conventional imaging arrays have limitations which affect performance. One limitation of digital radiographic arrays employing MIS photosensors, for example, is a reduction in quantum efficiency due to capacitive division of charge between the capacitance of the gate dielectric and capacitance of the semiconductor. Conventional MIS photosensor architectures are well known to those of ordinary skill in the art, and thus will not be described herein in detail. For convenience, an equivalent circuit of an MIS photosensor is shown in FIG. 2A. That circuit consists of the capacitance of the insulator, given by $$C_i = \epsilon_i t_i,$$

in which $\epsilon_i$ is the dielectric constant of the insulator and $t_i$ is the insulator thickness, in series with the capacitance of the semiconductor $$C_s = \epsilon_s t_s,$$

in which $\epsilon_s$ is the dielectric constant of the semiconductor and $t_s$ is the semiconductor thickness. The thermal generation of charge in the semiconductor and the photo-generation of charge in the semiconductor act as current sources in parallel with the semiconductor capacitance. In the operation of the MIS photosensor, a reverse bias is applied between the common bias electrode contacting the semiconductor and the pixel electrode contacting the insulator. When the semiconductor of the MIS photosensor consists of an N-type doped layer overlying an intrinsic semiconductor layer, the semiconductor contact would be positive biased and the electrode contacting the insulator would be negative biased.

Exposure to light with energy levels above the semiconductor band gap results in creation of one electron-hole pair per absorbed photon and generates a charge difference between photosensor terminals. Due to the electric field in the semiconductor resulting from the applied bias, the electrons flow out through the N+ semiconductor into the bias line while the holes drift to the interface between the semiconductor and the insulator. The mirror charge on the electrode contacting the gate dielectric is less than the number of holes at the silicon-insulator interface due to capacitive division between the insulator capacitance $C_i$ and the semiconductor capacitance $C_s$. The photocurrent, $I_{PHOTO}$ in FIG. 2A, results in charge separation across the insulator capacitance $C_i$ with holes at the interface between the insulator and semiconductor and electrons in the top electrode. For convenience, this reduction in charge is called the charge transfer efficiency, or CTE:

$$CTE = C_i/(C_i+C_s).$$

The quantum efficiency, defined as the number of electrons collected on the electrode contacting the insulator divided by the number of incident photons, is reduced by the CTE:

$$QE = T_{ITO} \cdot \exp(-\alpha_\lambda d_{n\text{-}layer}) \cdot (1-\exp(-\alpha_\lambda d_{i\text{-}layer})) \cdot CE \cdot CTE$$

Where $T_{ITO}$ is the optical transmission of the transparent electrode (typically Indium Tin Oxide), $\alpha_\lambda$ is the optical absorption coefficient of the semiconductor (typically amorphous silicon) and $d_{n\text{-}layer}$ and $d_{i\text{-}layer}$ are the thicknesses of the doped layer (typically n-doped amorphous silicon) and the intrinsic layer, respectively, and CE is the charge collection efficiency in the intrinsic layer.

FIG. 2B shows the charge transfer efficiency as a function of the semiconductor and insulator thicknesses for the particular case of amorphous silicon semiconductor and silicon nitride insulator. For values typically used in prior art digital radiographic detectors employing MIS photosensors, the charge transfer efficiency can be as low as 50%-75%. This is a problem with the prior art devices.

In addition to low quantum efficiency, prior art devices also are subject to noise sources, including at least common-mode noise from gate line switching, power supply noise and ripple, and electromagnetic interference (EMI) pickup.

FIG. 3A shows a circuit diagram for a prior-art, thin-film transistor array with a 1-transistor passive pixel architecture with MIS photosensors and FIG. 3B shows a circuit diagram for a prior-art thin-film transistor array with a 1-transistor passive pixel architecture with PIN photosensors. In operation of these two architectures, the pixel is first reset by establishing a reverse bias across the photosensor. This is accomplished by closing a charge amplifier reset switch and turning the row select TFTs on. The anode of the photosensor is then set to Vbias, while the cathode of the photosensor is set to Vref. For the reverse bias condition Vref>VBIAS. Once the pixel is reset, the row select TFT is turned off and the device is isolated. Upon signal detection, electron hole pairs are generated, providing a charge difference between photosensor terminals, and are swept to the contacts by the electric field. These carriers remove existing charge at the terminals, effectively reducing the bias across the diode. During the read out stage, the amount of positive charge that is required to re-establish the initial reverse bias condition is measured through the use of the charge amplifier. This analog output signal that corresponds to this charge difference is then either converted directly or indirectly to provide digital values, depending on the signal processing techniques employed.

FIG. 3C illustrates the capacitive coupling between the gate lines and the data lines in the circuits of FIGS. 3A and 3B. These overlap capacitances include the physical overlaps of gate line and data line as well as the capacitances between the sources of the thin-film row select transistors and the gates of those transistors. Any noise or ripple on the gate line clocks feeds through onto the data lines in the ratio of the sum of the gate line to data line overlap capacitances to the total capacitance of the data line:

$$\Delta V_{noise\,feedthru} = \Delta V_{noise} \cdot N_{rows} \cdot C_{overlap}/C_{dataline},$$

where $\Delta V_{feedthru}$ is the voltage noise appearing on the data lines due to a $\Delta V_{noise}$ noise voltage on the gate lines, $N_{rows}$ is the number of rows in the image sensor, $C_{overlap}$ is the overlap capacitance between one row select line and one data line, and $C_{dataline}$ is the total data line capacitance. The corresponding noise charge $\Delta Q_{noise\,feedthru}$ sensed by the charge amplifier is given by:

$$\Delta Q_{noise\,feedthru} = \Delta V_{noise} \cdot N_{rows} \cdot C_{overlap}.$$

For a typical prior-art image sensor, the total overlap capacitance $N_{rows} \cdot C_{overlap}$ is typically half or more of the data line capacitance. For a typical 10 mV noise voltage on the gatelines, for example from power supply noise or clock driver noise, the noise voltage on the data line would be 5 mV, which is well within the signal range for the diagnostic region of interest for digital radiographic applications such as chest radiography, mammography, or fluoroscopy.

In most prior-art thin-film transistor arrays for digital radiographic sensing, this ratio of overlap capacitance to total data line capacitance is typically 0.5 to 0.9 since the overlap capacitance comprises the majority of the data line capacitance. Sources of noise or ripple in the gate line power supplies include noise from switching in switching power supplies, electromagnetic pick-up on power supply bias lines, and circuit noise in the integrated circuit used for generating the row-select clock pulses. Since this noise is usually temporally uncorrelated with the array readout timing, it cannot be removed by calibration.

A second source of noise in prior-art thin-film transistor arrays for digital radiography is the feed-through of the gate line row-select clock onto the data line. During readout, row select is performed by clocking the gate lines sequentially between an "off" voltage which maintains the TFT switch in the pixel in a high-resistance state to an "on" voltage which turns the TFT switch in the pixels in that row to a low-resistance state. For amorphous silicon or polycrystalline silicon thin film transistors, this voltage is typically 20V or higher. The feedthrough voltage can be approximated by:

$$V_{feedthru} = \Delta V_{row\,select} \cdot C_{overlap}/C_{dataline}$$

And the feedthrough charge $Q_{feedthru}$ is approximated by $$Q_{feedthru} = \Delta V_{row\,select} \cdot C_{overlap}$$

Where $\Delta V_{row\,select}$ is the voltage swing on the row select line, $C_{overlap}$ is the overlap capacitance between a row select line (gate line) and a data line, and $C_{dataline}$ is the total data line capacitance. Since the overlap capacitance is generally half or more of total data line capacitance in thin-film TFT arrays for digital radiographic applications, the resulting feedthrough voltage can be significant as compared to the signal charge. For a typical prior-art radiographic array with 2,000 rows, the feedthrough voltage from a 20V clock pulse would be ~10 mV, equivalent to a signal level well within the diagnostic region of interest for most radiographic applications. This coupling is not entirely reversed when the device is subsequently switched off, making it potentially difficult to calibrate for such an offset.

A third source of noise in prior-art thin-film transistor arrays for digital radiography is the electromagnetic pick-up on the data lines. In radiographic imaging applications, the array dimensions range from 12 inches to 17 inches in length, the 12-inch to 17-inch long data lines act as antennas that pick up signals from stray electromagnetic fields. These stray electromagnetic fields are caused by sources such as electromagnetic emission from circuit boards supporting the radiographic imaging array, which are normally in close proximity to the array, electromagnetic fields from the X-ray generator used in conjunction with the radiographic imaging panel, electromagnetic fields from building power lines, radio-frequency communications, equipment operating in the proximity of the radiographic imaging system, and other sources of electromagnetic fields external to the panel.

Given these difficulties, it is apparent that there would be advantages to readout circuitry solutions that minimize or eliminate noise-related problems, particularly for systems using lower radiation levels.

A second class of prior-art thin-film-transistor image sensing arrays, termed active pixel imaging arrays, utilize amplifiers within each pixel. Whether utilizing MIS photosensors, PIN photodiodes, or other photosensors, these active pixel imaging arrays also suffer from the same difficulties as described above for the passive pixel arrays.

Thus, existing devices exhibit relatively low overall quantum efficiency and are subject to noise sources, including common-mode noise from gate line switching, power supply noise and ripple, and electromagnetic interference (EMI) pickup. Existing panels do not achieve limited quantum performance, even at radiation levels as high as 1.0 mR. There can be a large offset (for example, an offset of 200 mV or more) in signal noise due to coupling through channel capacitance when an address switching TFT is switched off. This coupling is not reversed when the device is subsequently switched on, making it potentially difficult to calibrate for such an offset. Long data lines, some in excess of 17 inches, characteristically form antenna structures for EMI. This is not easily compensated by grounding techniques. The addition of EMI shielding, while it has some beneficial effects, is costly and adds weight. Gate line voltage noise feeds through to data lines due to trace overlap capacitance, so that TFT gate-to-drain capacitance effectively appears on the data lines.

Thus, given these difficulties, it is apparent that there would be advantages to readout circuitry solutions that minimize or eliminate noise-related problems, particularly for systems using relatively lower radiation levels.

SUMMARY OF THE INVENTION

In one aspect, the present invention remedies the foregoing needs in the art by providing a light sensing array having a plurality of electrically isolated photosensors and a differential circuit. Each photosensor includes a first terminal and a second terminal, with each of the terminals of each photosensor being isolated from the terminals of the other photosensors. Each photosensor responds to an incident light level by producing a charge difference between the first and second terminal. The differential circuit is selectively coupled to the first and second terminals of one of the photosensors and produces an output signal related to the charge difference between the first and second terminals.

The apparatus of the present invention can help to reduce the effects of common-mode noise in the obtained image.

These and other objects, features, and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings.

FIG. 4I is a schematic diagram showing the capacitances between the gate lines and the two differential data lines in each pixel of the arrays of FIGS. 4A and 4B.

DETAILED DESCRIPTION OF THE INVENTION

It is to be understood that elements not specifically shown or described may take various forms well known to those skilled in the art.

Figure 1:
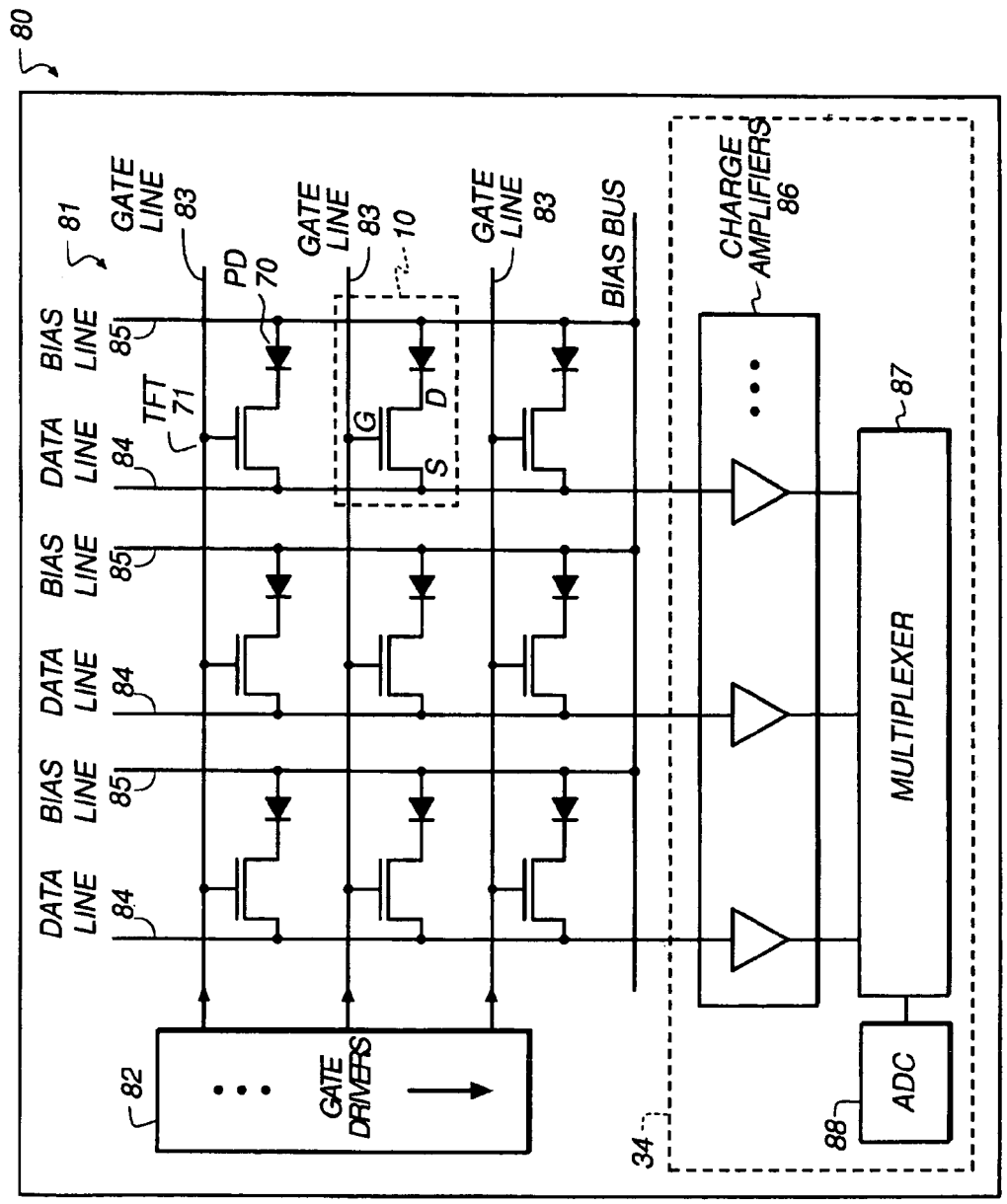
FIG. 1 is a schematic diagram showing components of a conventional flat-panel imager.
Figure 2A:
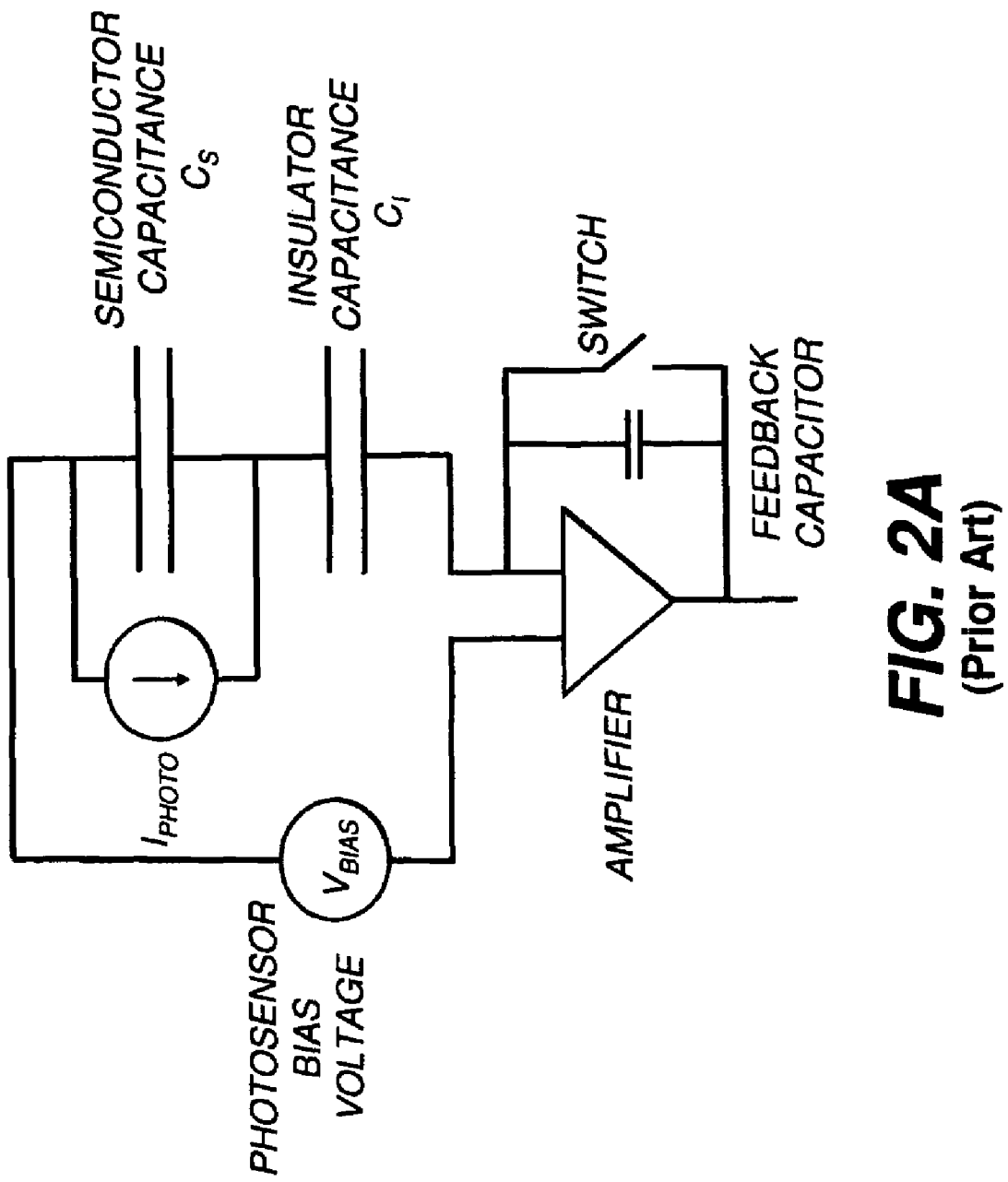
FIG. 2A shows an equivalent circuit for an MIS photosensor.
Figure 2B:
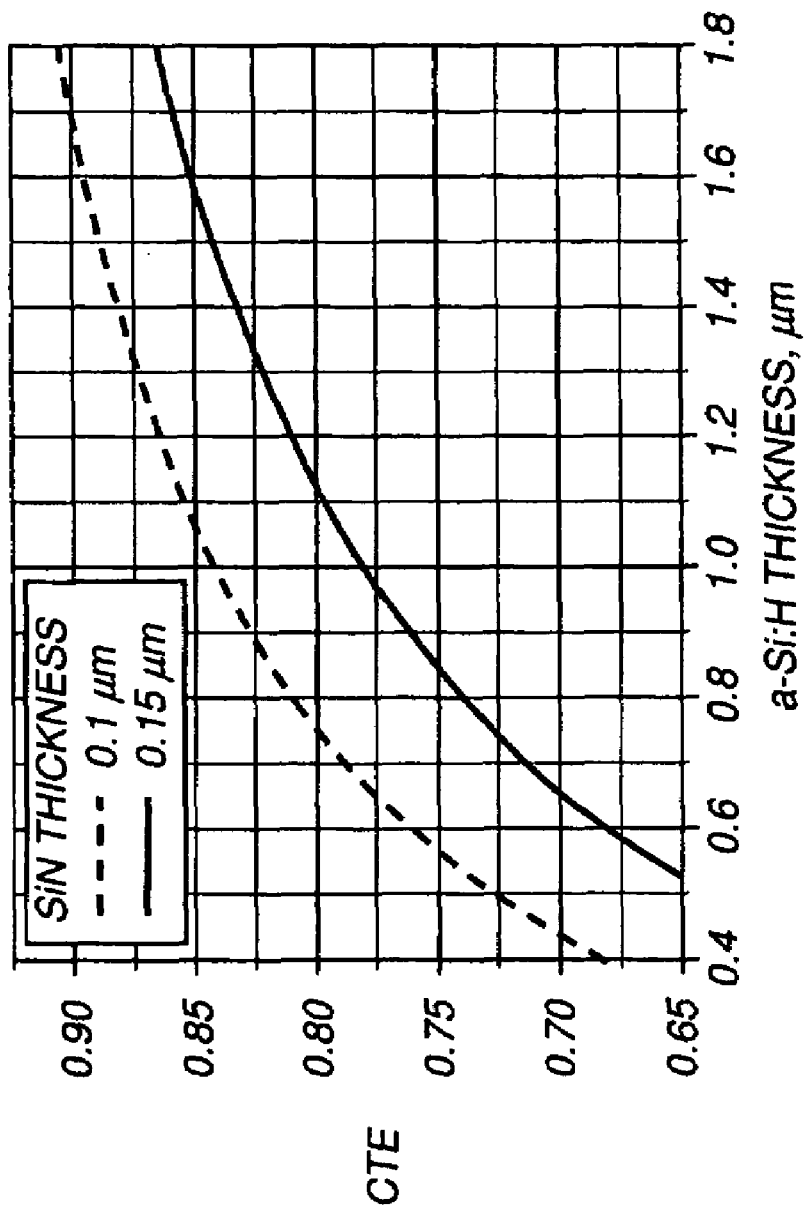
FIG. 2B shows the charge transfer efficiency as a function of the semiconductor and insulator thicknesses for the particular case of amorphous silicon semiconductor and silicon nitride insulator.
Figure 3A:
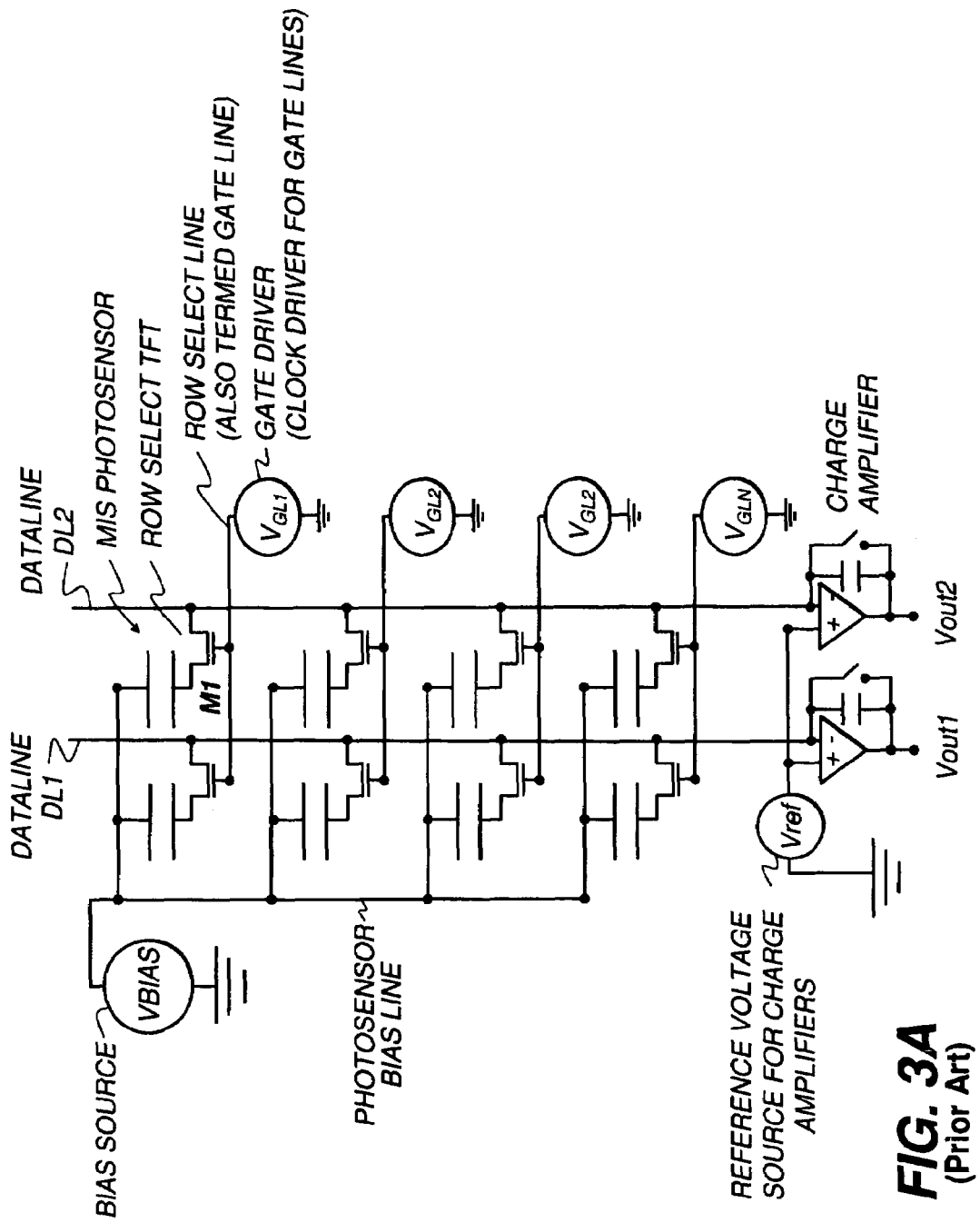
FIG. 3A shows a circuit diagram for a prior-art thin-film transistor array with a 1-transistor passive pixel architecture with MIS photosensor.
Figure 3B:
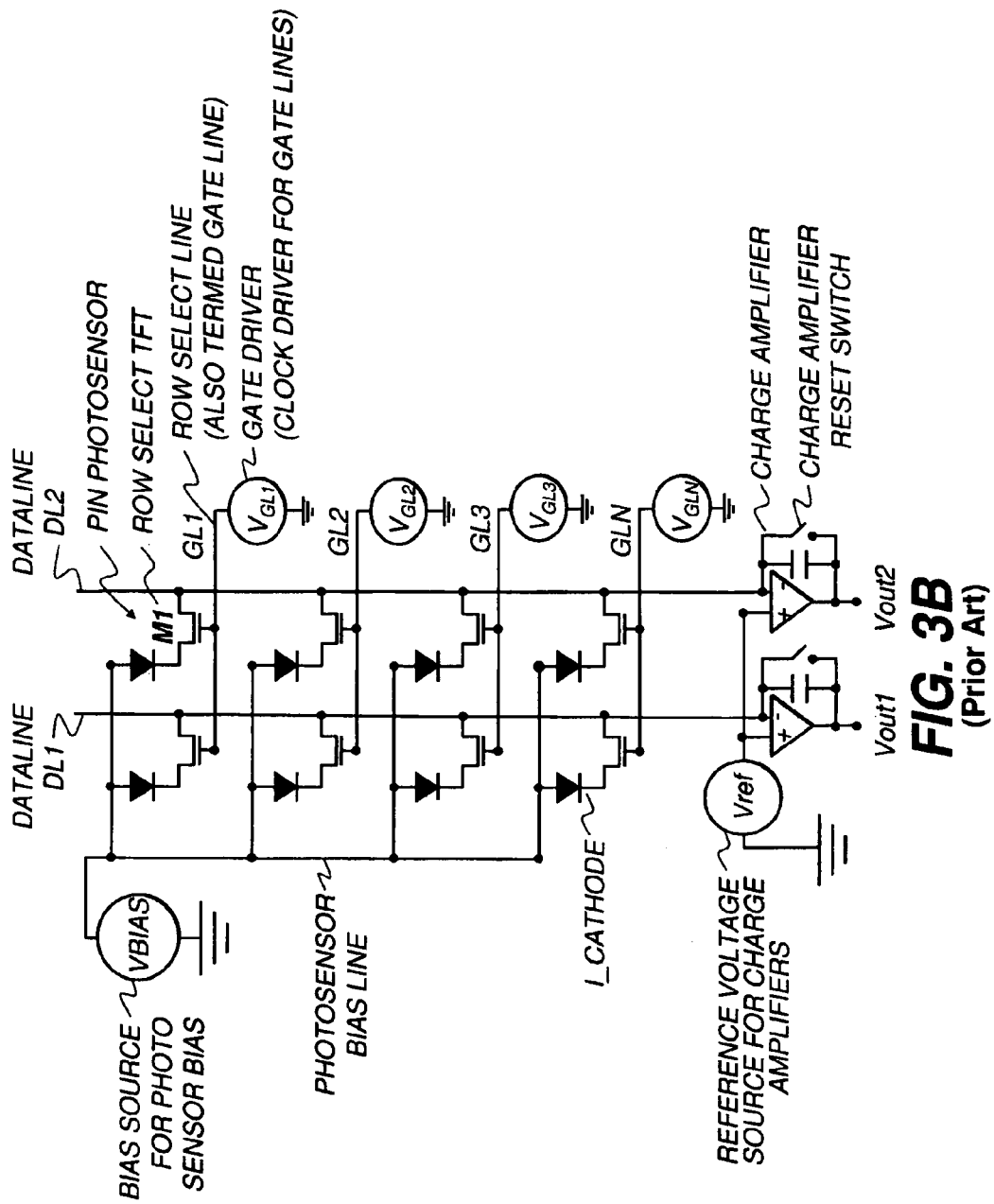
FIG. 3B shows a circuit diagram for a prior-art thin-film transistor array with a 1-transistor passive pixel architecture with PIN photosensor.
Figure 3C:
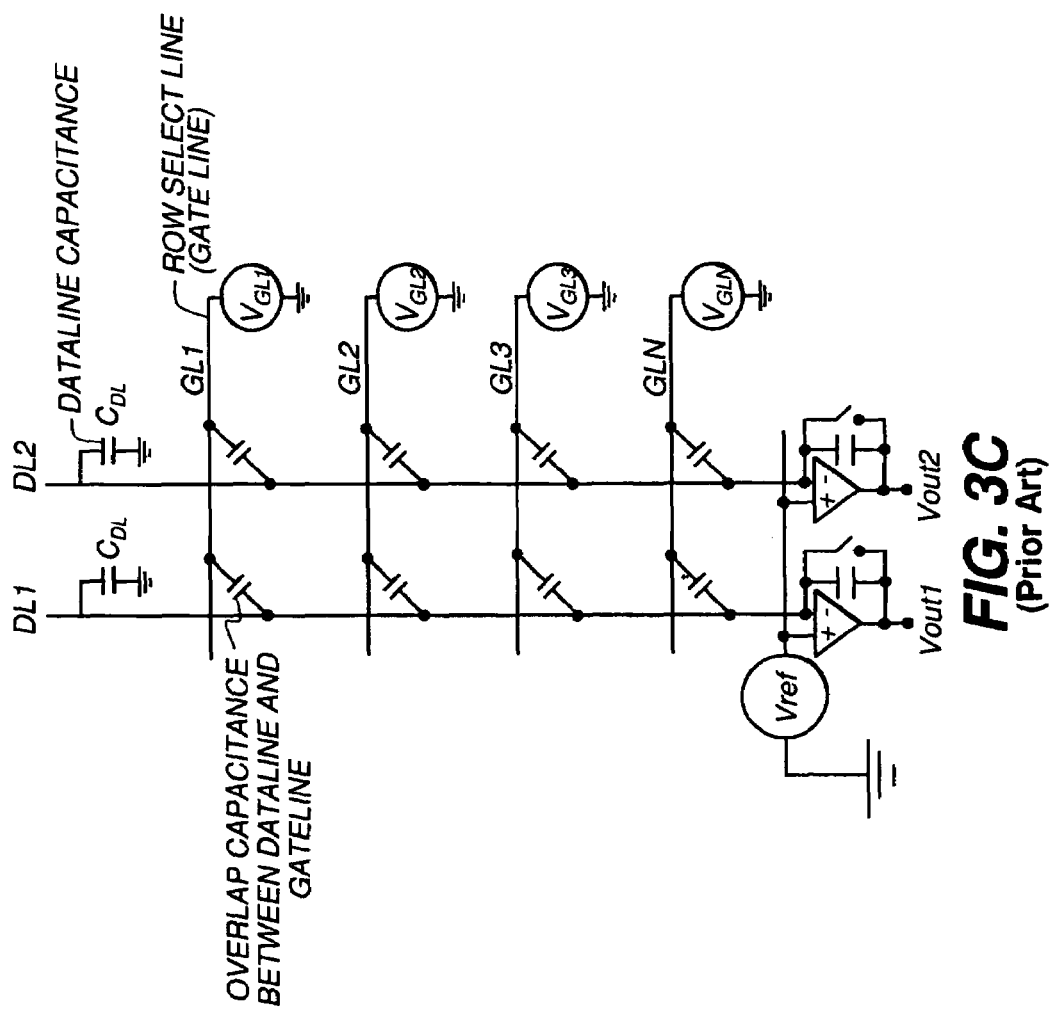
FIG. 3C shows the capacitive coupling between the gate lines and the data lines in the circuits of FIGS. 3A and 3B.

The schematic diagram of FIG. 3A, illustrated above, showed the conventional charge amplifier arrangement for a 2 column×4 row portion of an array using MIS photosensors and FIG. 3B showed the conventional architecture for a 2 column×4 row portion of an array using PIN photodiodes. In these arrangements, the charge amplifiers typically are located off-panel and connected through a flexible connector or other means. They have a connection to a bias voltage and to the switched signal from a switching element connected to a terminal of photodiode 40 or other photosensor. The second terminal of photodiode 40 can be connected to a bias voltage, with the difference between the first and second bias voltages being the reverse bias set across the photodiode when the gate line is turned on.

Figure 4A:
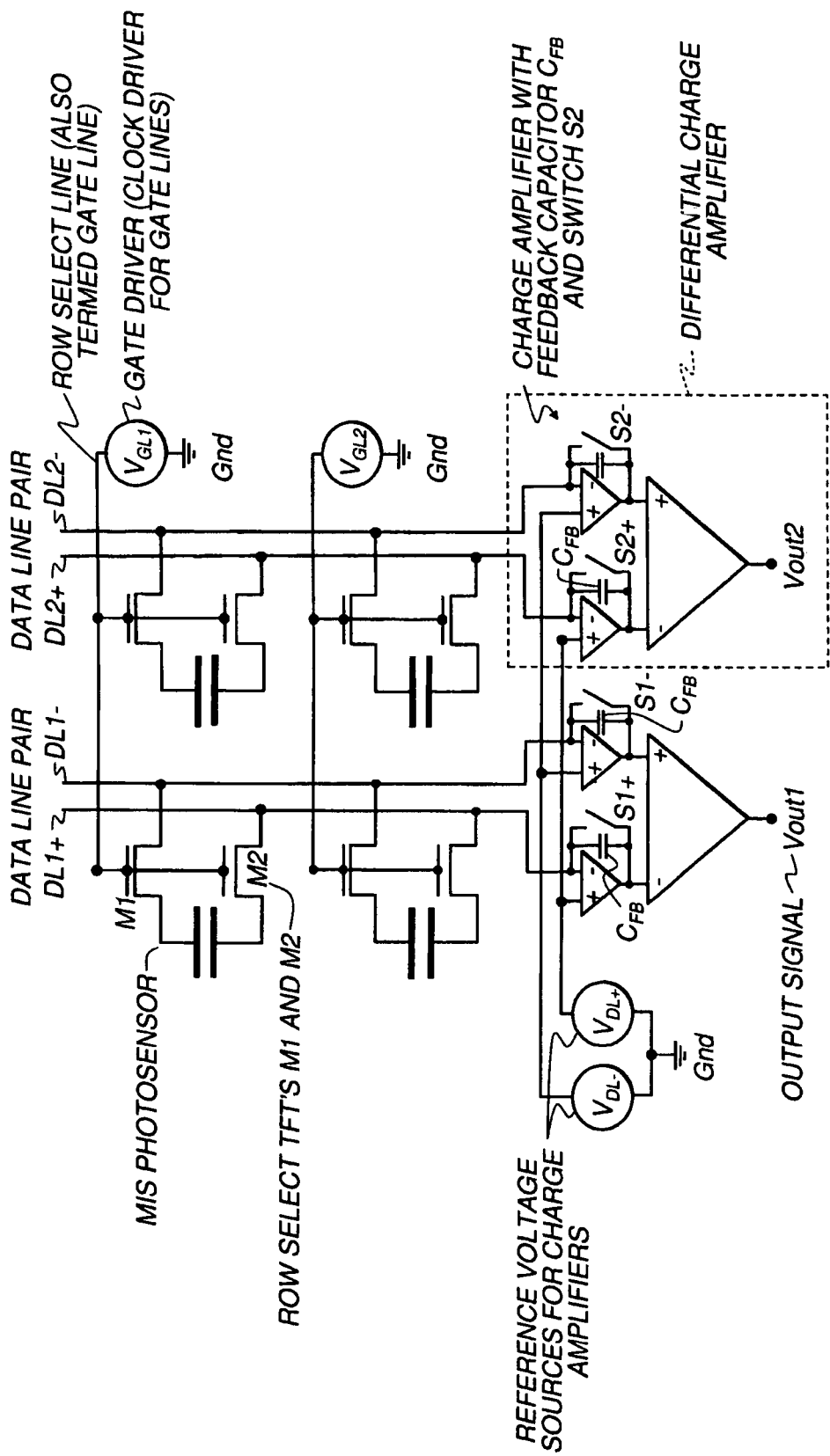
FIG. 4A shows a 2×2 portion of a differential pixel array design and differential charge amplifiers with an MIS photosensor.
Figure 4B:
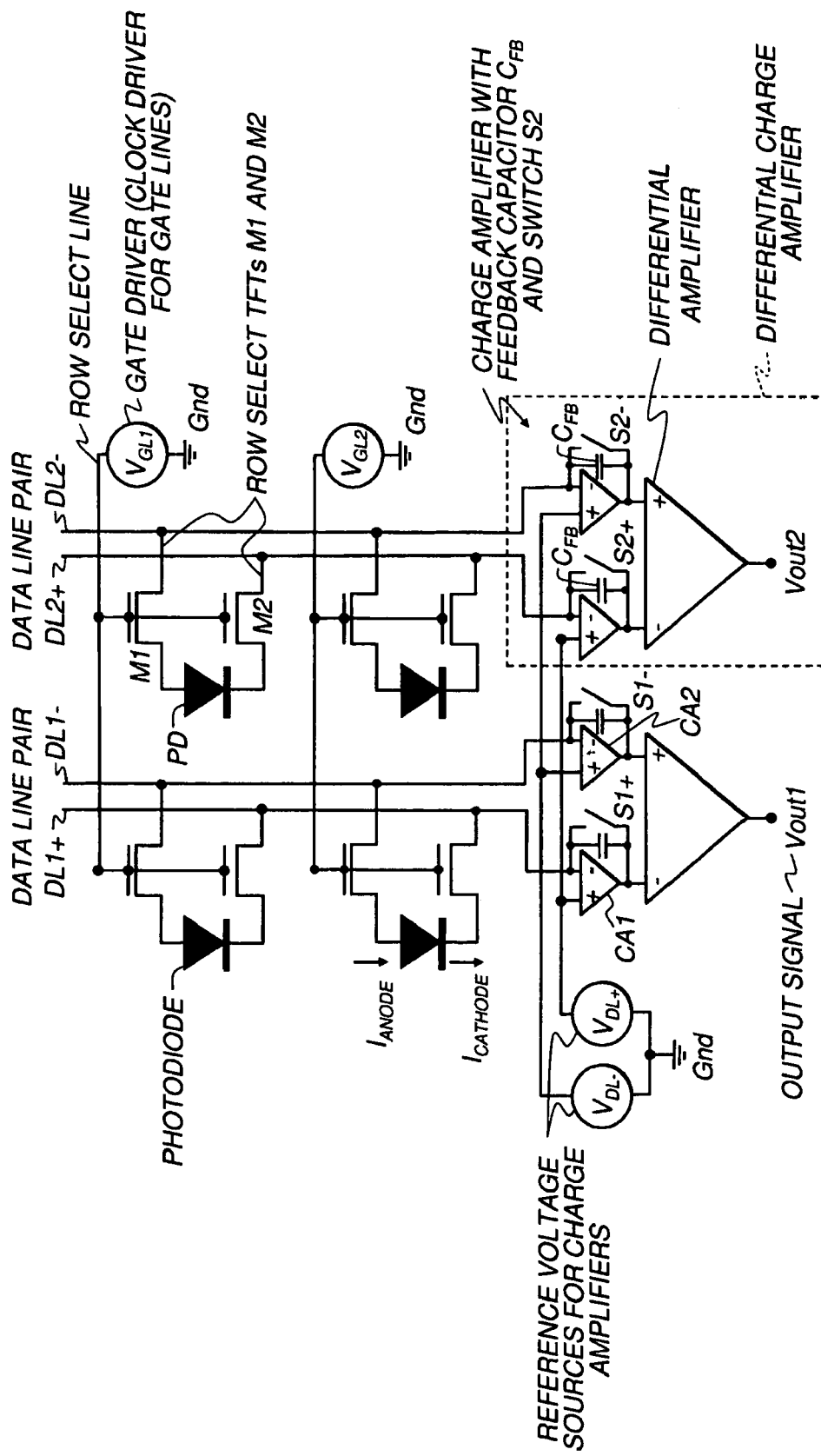
FIG. 4B shows a 2×2 portion of a differential pixel array design and differential charge amplifiers with a photodiode.

By comparison with FIGS. 3A and 3B, FIG. 4A shows a 2×2 portion of a differential pixel array design in an embodiment of the present invention which uses MIS photosensor technology and FIG. 4B shows a 2×2 portion of an array design according to the invention that uses PIN photosensor technology. For each pixel depicted in FIGS. 4A and 4B, there is a corresponding photosensor PD and switches M1, M2 connecting the two photosensor terminals to two data lines DL−, DL+ respectively. Lines GL1 and GL2 are gatelines for the first and second row, respectively, and each gate line controls the switches M1, M2 associated with each of the pixels arranged in that row. In the embodiment shown in FIG. 4A, the differential data lines DL+, DL− are terminated in separate charge amplifiers CA+, CA−, each with its own feedback capacitor and its own reset switch S+, S−. A bias voltage $V_{BIAS}$ is applied between the second terminals of the two charge amplifiers.

Figure 4C:
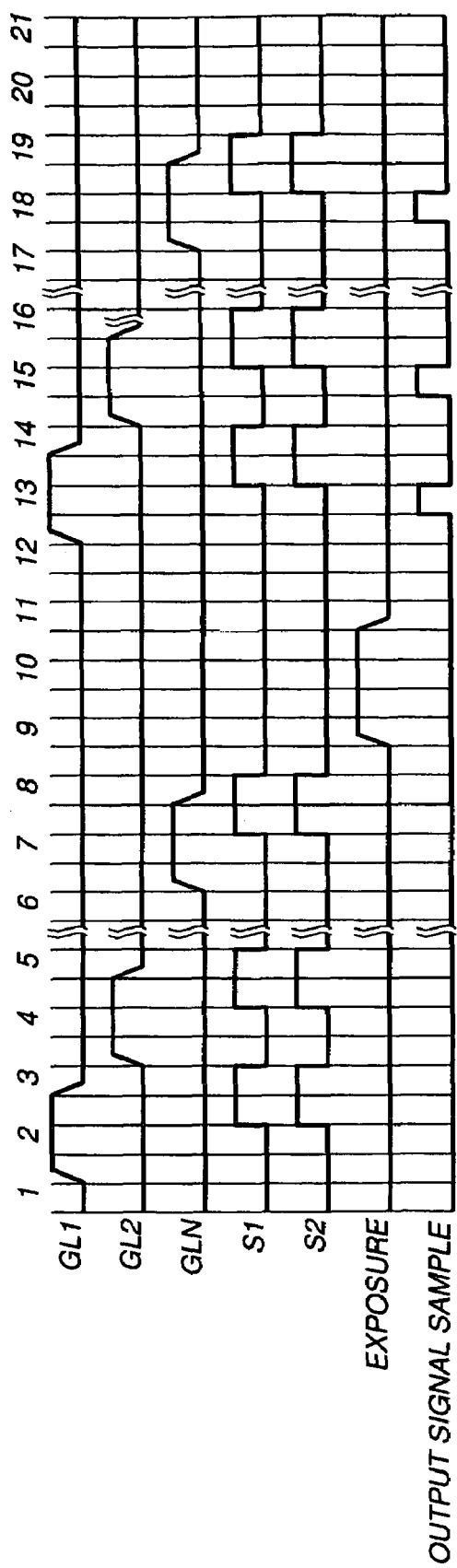
FIG. 4C is a timing diagram for the arrays of FIGS. 4A and 4B.

One method of operation for the arrays of FIGS. 4A and 4B can be understood with reference to the timing diagram illustrated in FIG. 4C. Prior to exposure to radiation, each of the row-select lines is sequentially addressed. The gate line of a selected row turns on the thin-film transistor switches M1, M2 in all the pixels in that row. The reset switches S+, S− are then turned on, causing the bias voltage between the inputs of the charge amplifiers to be mirrored as a voltage difference between data lines DL+, DL− and thereby a voltage difference between the two terminals of the photosensors in the selected row. Following sufficient time for the voltage difference across the photodiode terminals to settle to $V_{BIAS}$, the reset switches S+, S− can then be turned off and the row select line can be turned off. Once all the row select lines have been sequentially enabled, the sensor is reset and ready for exposure. The imager is then exposed, such as by an X-ray exposure from a pulsed X-ray generator or a light exposure controlled by a shutter.

During exposure, the row select gates are held off, isolating both terminals of the photosensor. With an MIS photosensor, electrons that are generated by the light or radiation exposure drift to the n-side of the photodiode and the holes drift to the p-side under the influence of the electric field in the photodiode. The voltage across the isolated photodiodes in each of the pixels decreases from the original bias voltage by an amount equal to the photogenerated charge divided by the photodiode capacitance. Following exposure, the signal charge is read out by sequentially clocking the row select lines. The signal on the n+ side of the photosensor is read out through one charge amplifier data path, and the signal at the semiconductor-insulator interface is read out through another charge amplifier data path. These two signals are combined to form the output signal. Using this arrangement, the total photo-generated signal is being measured, so the charge transfer efficiency approaches unity. This is clearly advantaged over the prior art where the charge transfer efficiency is significantly less than unity. Following the completion of the sensing of the signal charge, the reset switches S+, S− in the charge amplifiers can be turned on, and $V_{BIAS}$ can be adjusted accordingly to reset the photosensor.

When a PIN photosensor is incorporated (FIG. 4B), the operational timing is similar. However, during exposure, the photo-generated charge recombines with the existing terminal charge, effectively reducing the bias across the diode. During read out, the amount of positive charge to re-establish the bias on the photosensor, the integral of $I_{CATHODE}$, is read out by CA1, and the amount of negative charge, i.e., the integral of $I_{ANODE}$, is read out by CA2. The outputs of these charge sensitive amplifiers are then input to a differential amplifier that yields an analog signal at 2-times the prior art analog signal level. Conventional systems read out one of these signals, not both. This double sampling, with increase in signal level, serves to improve the signal-to-noise performance of the circuit. Following completion of charge sensing, the reset switches S+, S− in the charge amplifier can be turned on along with the gate lines, thereby holding the photosensor in a reset condition.

Figure 4D:
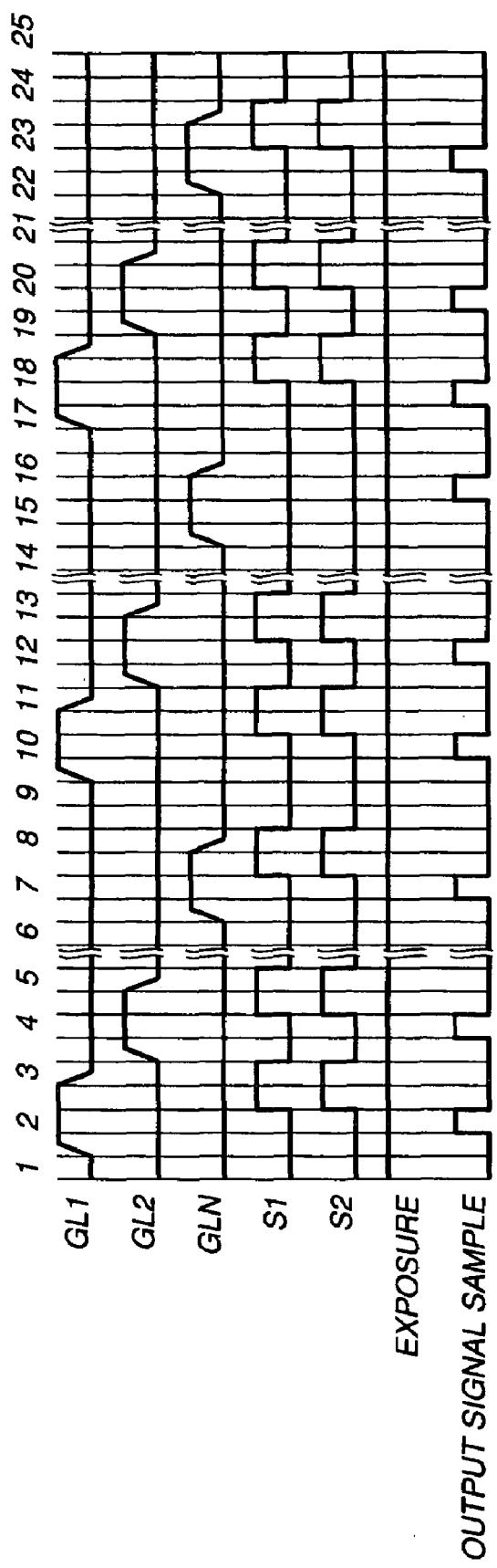
FIG. 4D is another timing diagram for the arrays of FIGS. 4A and 4B in an alternate readout mode.

A second method of operation of the arrays of FIGS. 4A and 4B is illustrated in the timing diagram of FIG. 4D. In this "video readout" method of operation, the array is continuously operated without regard to the timing of the exposure. A start-of-frame clock initiates readout of the array. The gate lines are sequentially clocked and the signal is sensed with the differential charge amplifiers at the end of the rows as described in the single-exposure mode described above. Following the completion of frame readout, the start-of-frame clock initiates a new readout of the array. The exposure may be continuous or may be controlled so as to occur between the completion of readout and the start of the next frame.

Figure 4E:
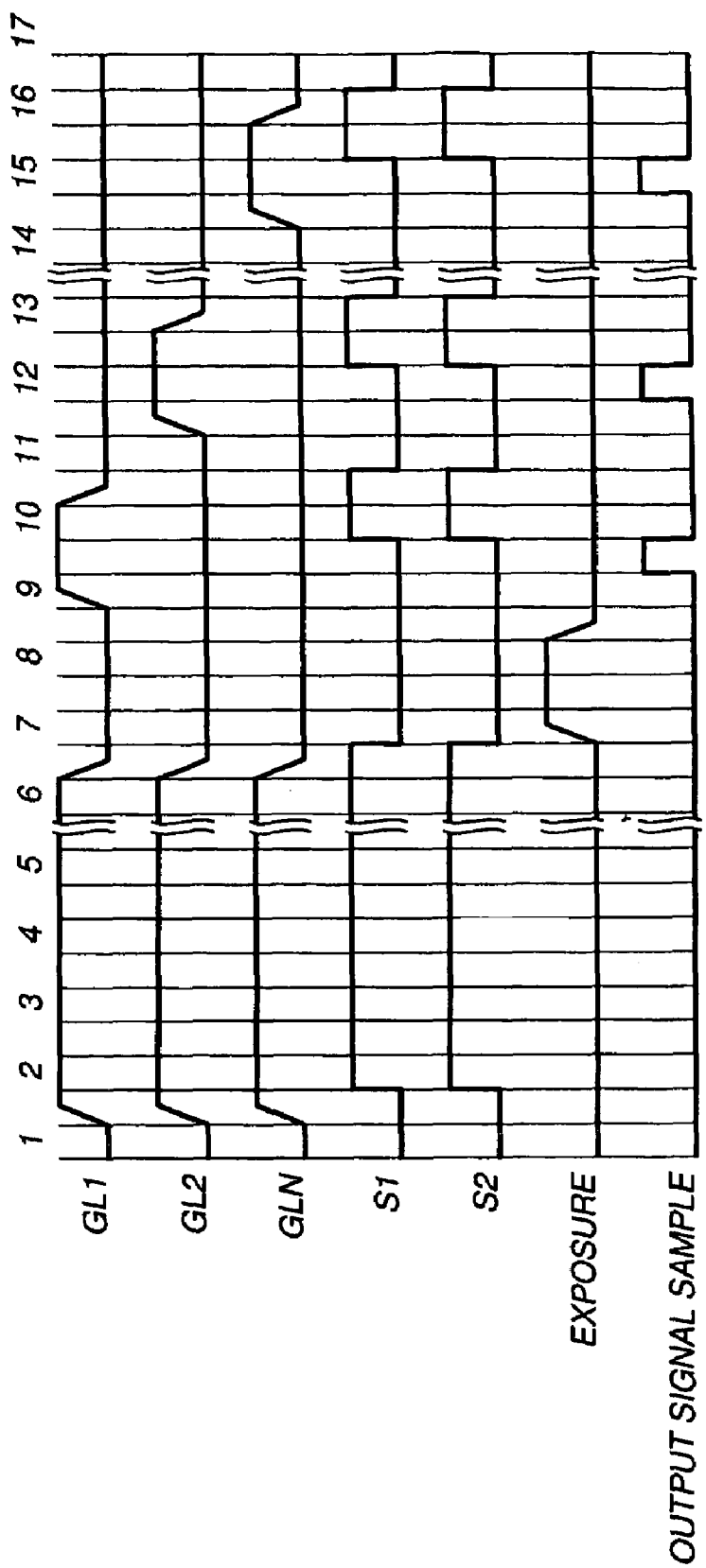
FIG. 4E is another timing diagram for the arrays of FIGS. 4A and 4B in an alternate readout mode.

A third method of operation of the arrays of FIGS. 4A and 4B is illustrated in the timing diagram of FIG. 4E. In this "global reset" method of operation, all rows in the array are reset simultaneously prior to exposure. In the timing diagram of FIG. 4E, all gate lines are held on, connecting the two terminals of all of the photosensors in a column to the two data lines in each column. The switches S+, S− in the charge amplifiers for the data lines DL+, DL− are also held on prior to exposure, holding the voltage difference between the data lines DL+, DL− equal to $V_{BIAS}$. This global reset ensures that all pixels are fully reset prior to exposure and prevents thermally-generated charge from accumulating in the photosensors prior to exposure. Prior to the start of exposure, all gate lines are turned off, allowing photo-generated charge to be integrated on the photosensors during exposure. Readout is performed as described in the first method of operation.

Figure 4F:
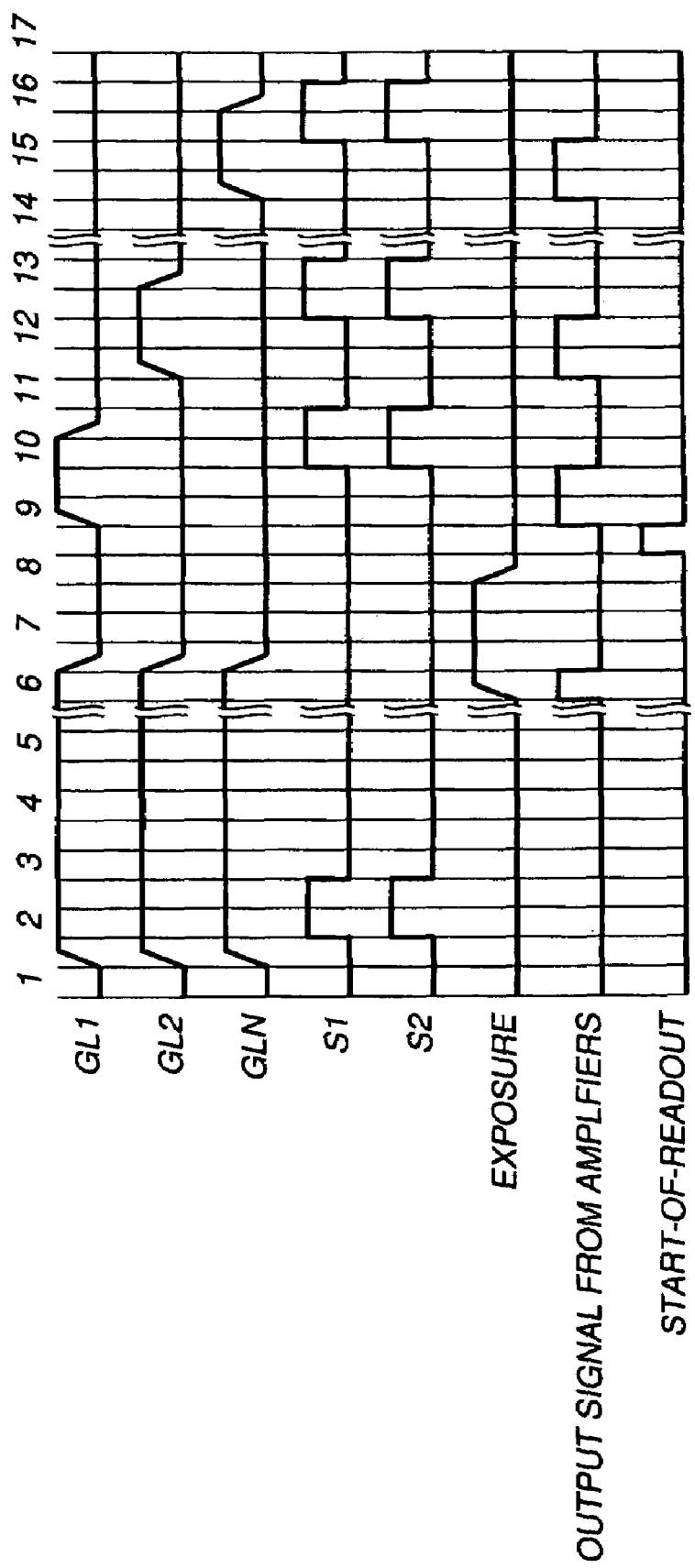
FIG. 4F is yet another timing diagram for the arrays of FIGS. 4A and 4B in an alternate readout mode.

A fourth method of operation is illustrated in the timing diagram of FIG. 4F. This "exposure detection" method of operation allows detection of the start of exposure, following which the array switches from an exposure-detection mode to an integration mode. In this method of operation, a global reset is performed by switching all of the row select lines on simultaneously while the switches S+, S− of all of the charge amplifiers are also turned on. This resets the voltage difference between the terminals of all of the photosensors to $V_{BIAS}$. Following settling of the bias voltage on the photosensors, the switches S+, S− on all the charge amplifiers are turned off, allowing signal integration. Since all of the row select gates are turned on, all the photodiodes in a column are connected to the data lines in that column. Exposure of any photosensor on that column results in an increase in signal output on the charge amplifier. Detection of that signal at the start of exposure can be used to switch the array to signal integration mode by switching all of the row select lines off, allowing each photosensor to integrate photo-generated charge. Following completion of exposure, the array can be read out as described in the first method of operation. This method of operation is particularly important for radiographic applications in which the X-ray source is not connected to the X-ray detector, so the start of exposure is unknown without the ability to sense the start of exposure internal to the detector.

Figure 4G:
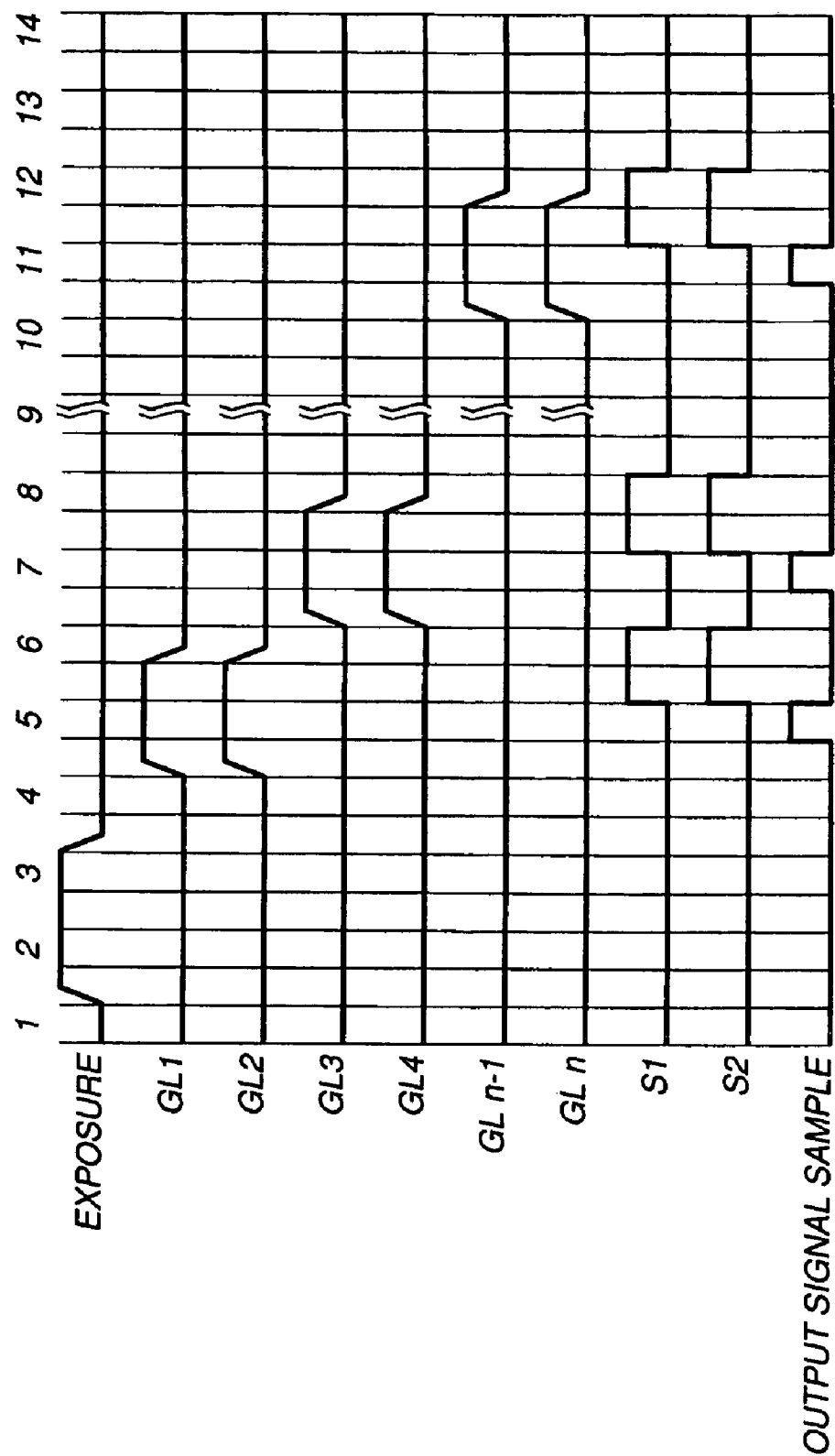
FIG. 4G is yet another timing diagram for the arrays of FIGS. 4A and 4B in an alternate readout mode.

A fifth method of operation is illustrated in FIG. 4G. This "binning" method of operation allows increased signal levels at the expense of spatial resolution. In this method of signal readout, two or more contiguous rows are addressed simultaneously, connecting the terminals from two or more adjacent photodiodes to the respective data lines in each column.

With reference to FIG. 4G for the case of a 2-fold binning, the row select lines GL1, GL2 are addressed simultaneously, followed by successive pairs of row select lines. The total charge from each pair of photodiodes is sensed by the charge amplifiers at the end of each data line. This method of operation is particularly beneficial in low exposure modalities, such as fluoroscopy.

Figure 4H:
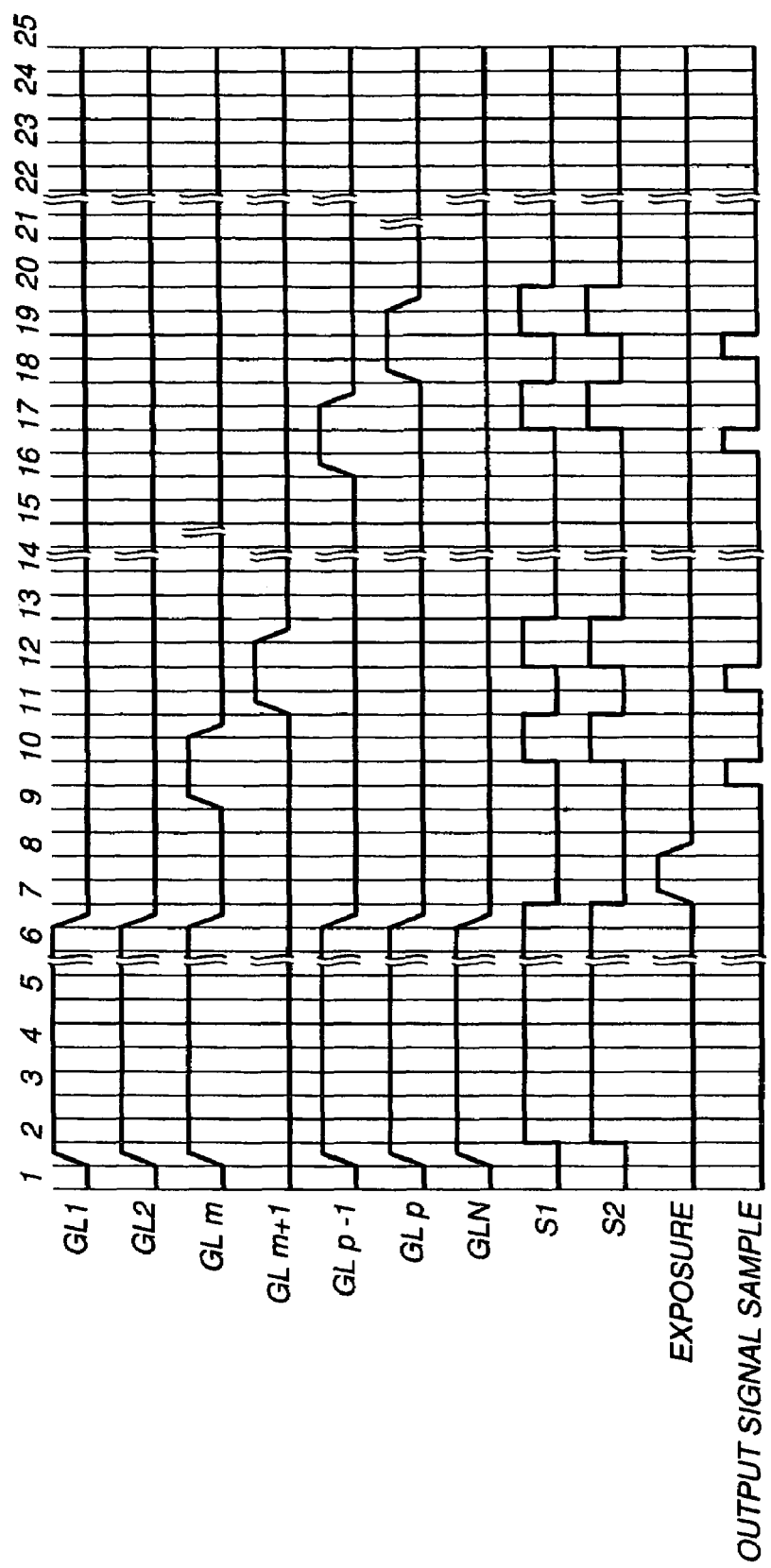
FIG. 4H is yet another timing diagram for the arrays of FIGS. 4A and 4B in an alternate readout mode.
Figure 41:
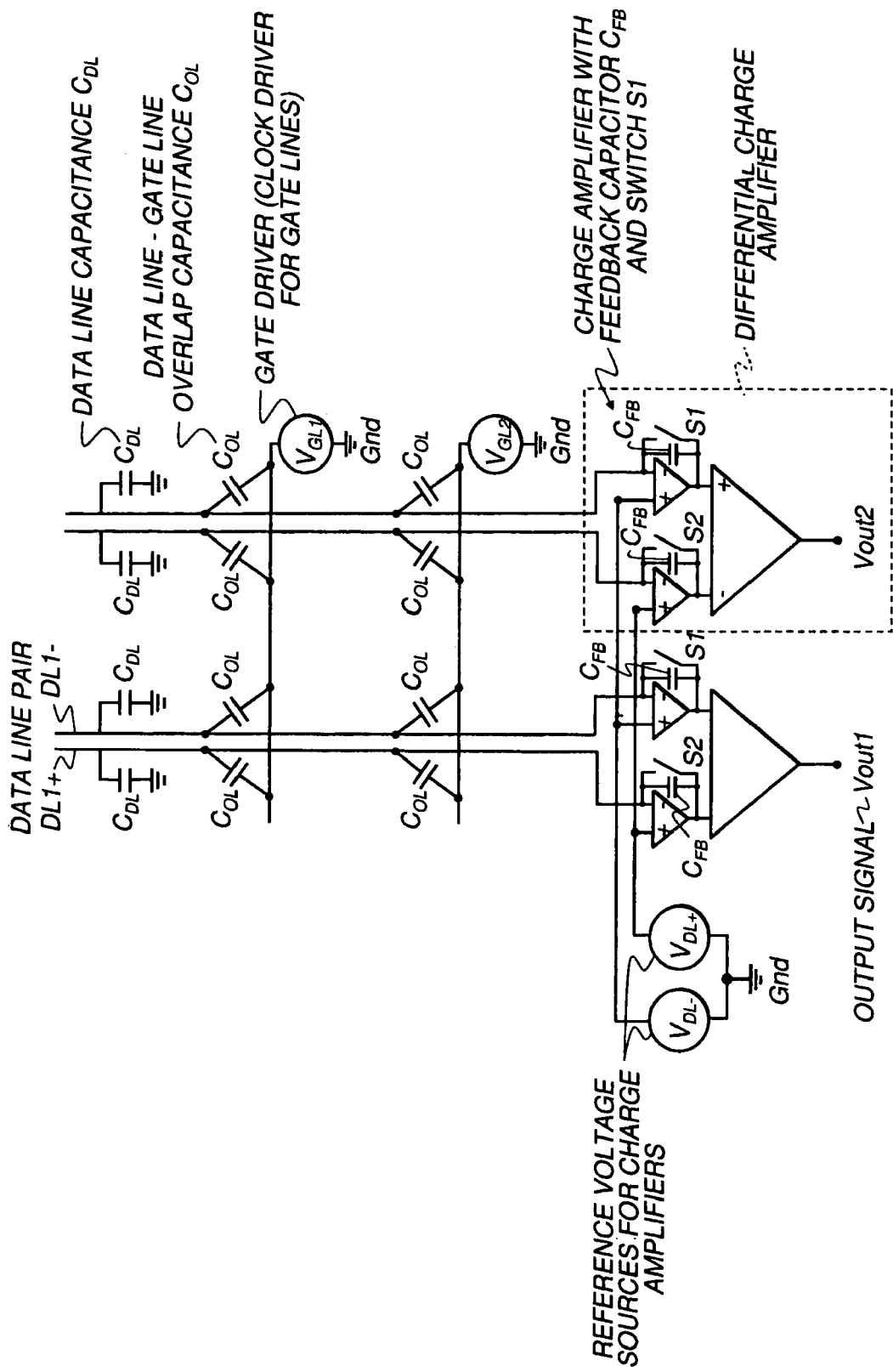

A sixth method of operation is illustrated in FIG. 4H. This "region of interest" method of operation allows readout of a selected subset of the pixels in an array. With reference to FIG. 4H, a global reset is performed as described above. This resets the voltages between the terminals for all the photosensors in the array to $V_{BIAS}$. Following the global reset, the sensor is exposed. Readout is initiated by sequentially clocking only those row select lines in the region of interest. With reference to FIG. 4H, this region of interest is between row m and row p. This method of operation reduces readout time. It will be recognized other forms of reset (such as the scrolling reset discussed with reference to FIG. 4C) or other frame operating modes (such as the video mode of operation discussed with reference to FIG. 4D) could be combined with this region of interest readout method.

One advantage of the differential pixel architecture is suppression of common mode feedthrough and noise on the data lines. This advantage can be seen with reference to FIG. 4I, in which the capacitances between the gate lines and the two differential data lines in each pixel are illustrated. Several sources of noise feedthrough and clock feedthrough were noted above. The first of these was feedthrough of ripple or noise on the row select line voltages to the data lines. In prior art sensors the charge introduced on the data line due to noise on the row select lines, such as power supply ripple, was given by $$\Delta Q_{noise\,feedthru} = \Delta V_{noise} \cdot N_{rows} \cdot C_{overlap}$$

With reference to FIG. 4B, in the differential readout sensor this same noise feedthrough appears on both data lines DL+, DL− to the extent that the sum of the overlap capacitances on the data lines DL+, DL− are the same. Since the output signals from the two charge amplifiers corresponding to the data lines DL+, DL− are subtracted, either in the analog or digital domain, the residual signal is only due to differences in the total overlap capacitances between the row select lines and the two data lines:

$$\Delta Q_{noise\,feedthru} = \Delta V_{noise} \cdot N_{rows} \cdot (C_{overlap+} - C_{overlap-}).$$

Since the two data lines are defined lithographically, utilize the same inter-metal dielectric and are immediately adjacent to each other, the capacitances would be expected to match to better than 1%, thereby reducing the feedthrough noise charge by a factor of 100.

The second source of feedthrough from gate lines to data lines was the feedthrough of the gateline clock voltage to the data line. As described previously, in prior art sensors this can be approximated by:

$$V_{feedthru} = \Delta V_{row\,select} \cdot C_{overlap} / C_{data\,line}$$

and the feedthrough charge $Q_{feedthru}$ is approximated by $$Q_{feedthru} = \Delta V_{row\,select} \cdot C_{overlap}$$

where $\Delta V_{row\,select}$ is the voltage swing on the row select line, $C_{overlap}$ is the overlap capacitance between a row select line (gate line) and a data line, and $C_{data\,line}$ is the total data line capacitance. For the differential pixel sensor with isolated photodiodes of FIG. 4B, the data lines DL+, DL− receive the same charge feedthrough to the extent that the overlap capacitances are identical. Since the output signals from the two charge amplifiers corresponding to the data lines DL+, DL− are subtracted, either in the analog or digital domain, the residual signal is only due to differences in the total overlap capacitances between the row select lines and the two data lines:

$$\Delta Q_{noise\,feedthru} = \Delta V_{row\,select} \cdot (C_{overlap+} - C_{overlap-}).$$

Since the row select line and the two data lines are patterned photolithographically and are immediately adjacent to one another with the same intermetal dielectric, their capacitance would typically be matched to better than 5%, with differences arising from local linewidth variation in the data line or row select line. Thus the differential pixel sensor with isolated photodiodes is expected to reduce the row-select clock feedthrough by at least a factor of 20.

A third source of noise discussed in prior-art thin-film transistor arrays for digital radiography is the electromagnetic pick-up on the data lines. With reference to FIG. 4A, the two data lines are in close proximity and would thereby be exposed to approximately the same electromagnetic fields from sources internal and external to the radiographic panel enclosure. These sources included printed wiring boards, wiring harnesses and RF communication interfaces inside the enclosure, as well as power-lines, equipment and radio frequency interference external to the enclosure. To the extent that the two data lines receive the same electric fields due to electromagnetic interference and have identical capacitance, the net noise due to the difference in the outputs of the two charge amplifiers will be zero.

Figure 5:
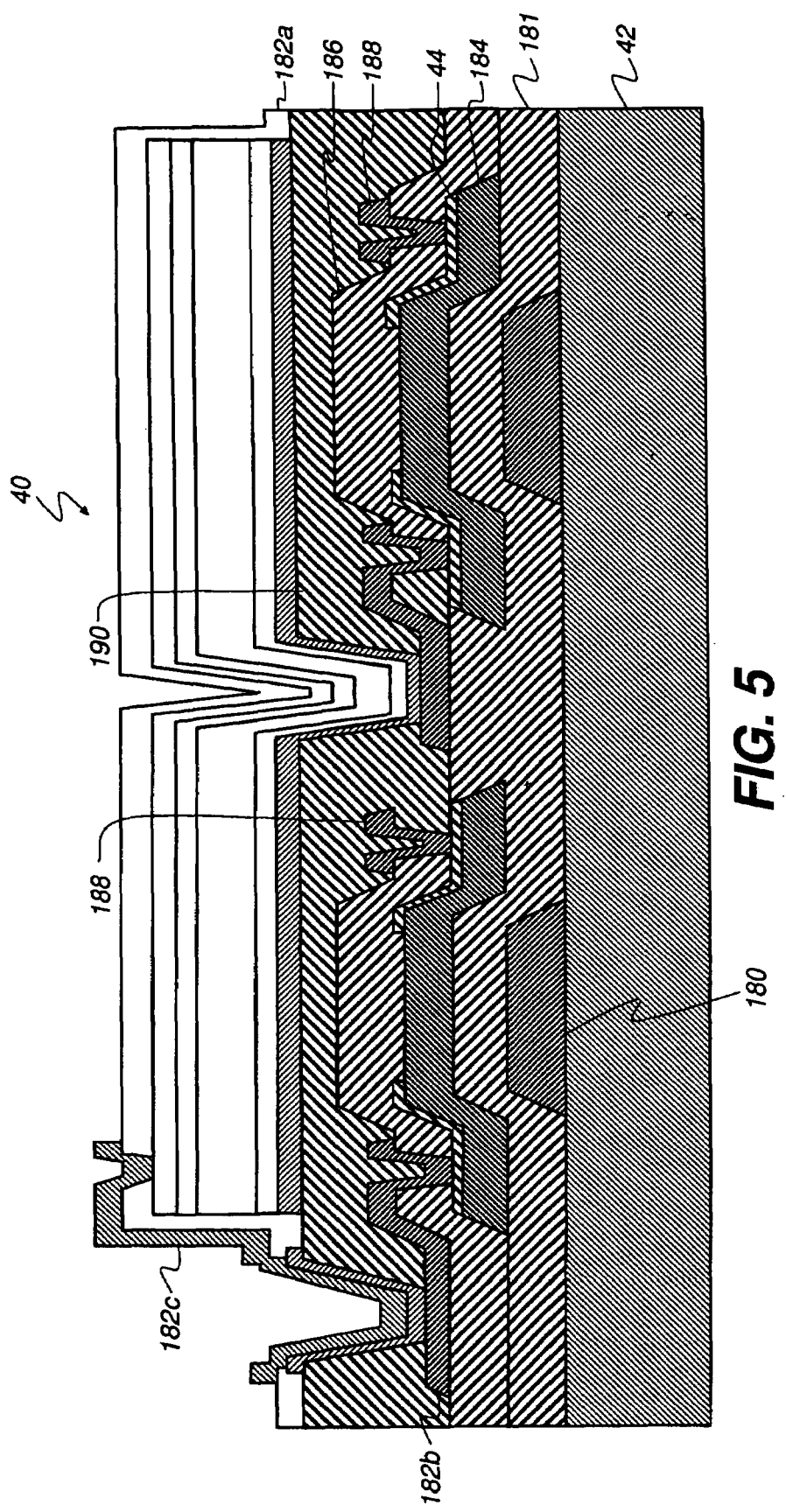
FIG. 5 is a cross-sectional view of an embodiment of the invention.

The cross-sectional diagram of FIG. 5 shows an exemplary embodiment with an MIS photosensor corresponding to the circuit diagram of a differential readout pixel with an MIS capacitor of FIG. 4A. Each transistor M1, M2 is formed by patterning an electrode 180 onto a substrate 42. Layers in succession for the transistors M1, M2 include an insulator 181, an undoped region 184, such as one formed from amorphous silicon, a doped region 44, an insulator layer 186, and a data line 188. There is a layer of an insulator 190 over the parts making up the transistors M1, M2. The MIS photodiode 40 is formed in the conventional manner, as is generally known in the art. The bottom terminal of the MIS photosensor is connected to the source of the first readout TFT M1 via interconnect 182a and the top terminal of the MIS photosensor is connected to the source 182b of the second readout TFT M2 via interconnect 182c. The photodiode is completely electrically isolated from other circuit components, including from other photodiodes, except through the first and the second readout TFTs. Other photosensors, including PIN photodiodes, for example, could also be sued in a similar arrangement, and other arrangements would be evident to those of skill in the art in view of this disclosure.

Figure 6:
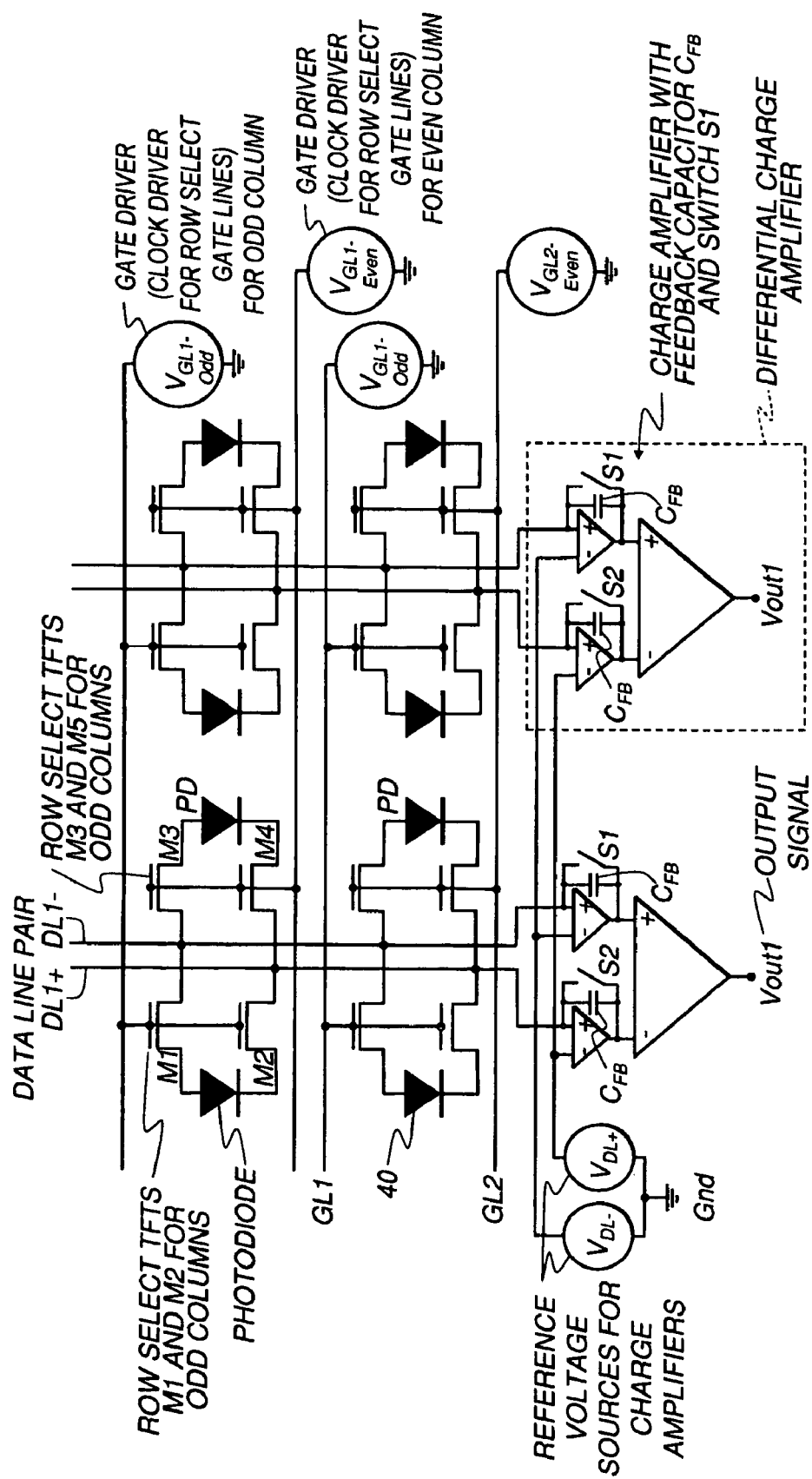
FIG. 6 is a schematic diagram of an embodiment in which two adjacent photosensors within the same row of the image sensor share the same pair of data lines.

FIG. 6 shows another embodiment of the invention, in which two adjacent photosensors 40 within the same row of the image sensor share the same pair of data lines. Each photosensor 40 of the pair of photosensors is individually selected using the solid state switches shown. In this embodiment, switching on the row select line GL1 connects the first set of photodiodes in the first row to the data lines and switching on the row select line GL2 connects a second set of photodiodes in the first row to the same data lines. This embodiment reduces the number of data lines and charge amplifiers by half.

Figure 7:
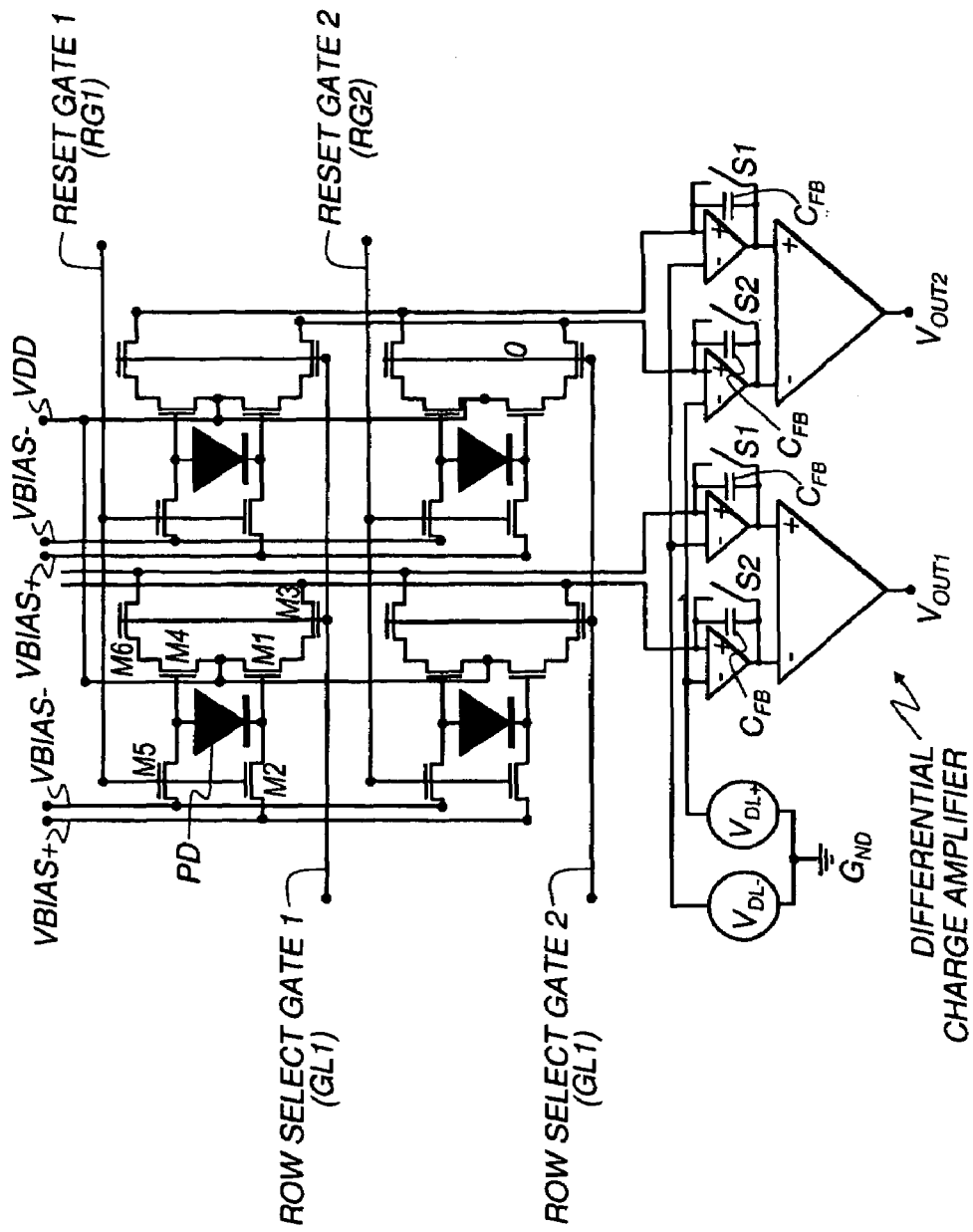
FIG. 7 is a schematic diagram showing an embodiment for an active pixel architecture.

FIG. 7 illustrates yet another alternative embodiment of the invention, for an active pixel architecture. In this embodiment, both terminals of the photosensor are connected to pixel amplifiers. With reference to FIG. 7, the amplifier for one terminal of the photosensor comprises an amplifier transistor M1, a row select transistor M2, and a reset transistor M3. Similarly, the amplifier for the second terminal of the photosensor comprises an amplifier transistor M4, a row select transistor M5, and a reset transistor M6. One terminal of the row select transistor M2 is connected to the first data line and one terminal of the row select transistor M5 is connected to the second data line. Similarly, one terminal of the reset transistor M3 is connected to the first reset bias line and one terminal of the reset transistor M6 is connected to the second reset bias line. The drain of the amplifier transistors M1, M4 maybe connected to a common bias supply, as shown in FIG. 7. For improved amplifier matching at the expense of additional routing, the drains of the amplifier transistors M1, M4 may optionally be connected to separate bias supplies.

The operation of the architecture shown in FIG. 7 may be understood as follows. Prior to signal integration, the reset transistors M3, M6 are turned on in order to reset the voltage of the two terminals on the photosensor by connecting the two terminals of the photosensor to their respective reset bias lines. During exposure, photo-current discharges the photodiode, causing the voltage difference between the two terminals to decrease. In order to read-out the image, the row select lines are scanned by sequentially turning on each of the row select gates in succession. When the row select line, also called a gate line, is turned on for a particular row, both row select transistors M2, M4 are turned on at the same time, coupling one terminal of each of the amplifier transistors M1, M3 to their respective data lines. In the circuit configuration shown in FIG. 7, currents flow in each of the data lines proportional to the gate voltage on the amplifier transistors M1, M3. The charge amplifiers for each of the data lines integrate the currents over the time period that the row select transistor is on. The difference in the output voltage of the two charge amplifiers is thus proportional to the difference in currents in the two data lines and thereby to the difference in voltages on the gates of the amplifier transistors M1, M3. It can be recognized by one skilled in the art that other column amplifier designs, such as a current mirror, can be used to convert the current signal on the data line to an output voltage.

Figure 8:
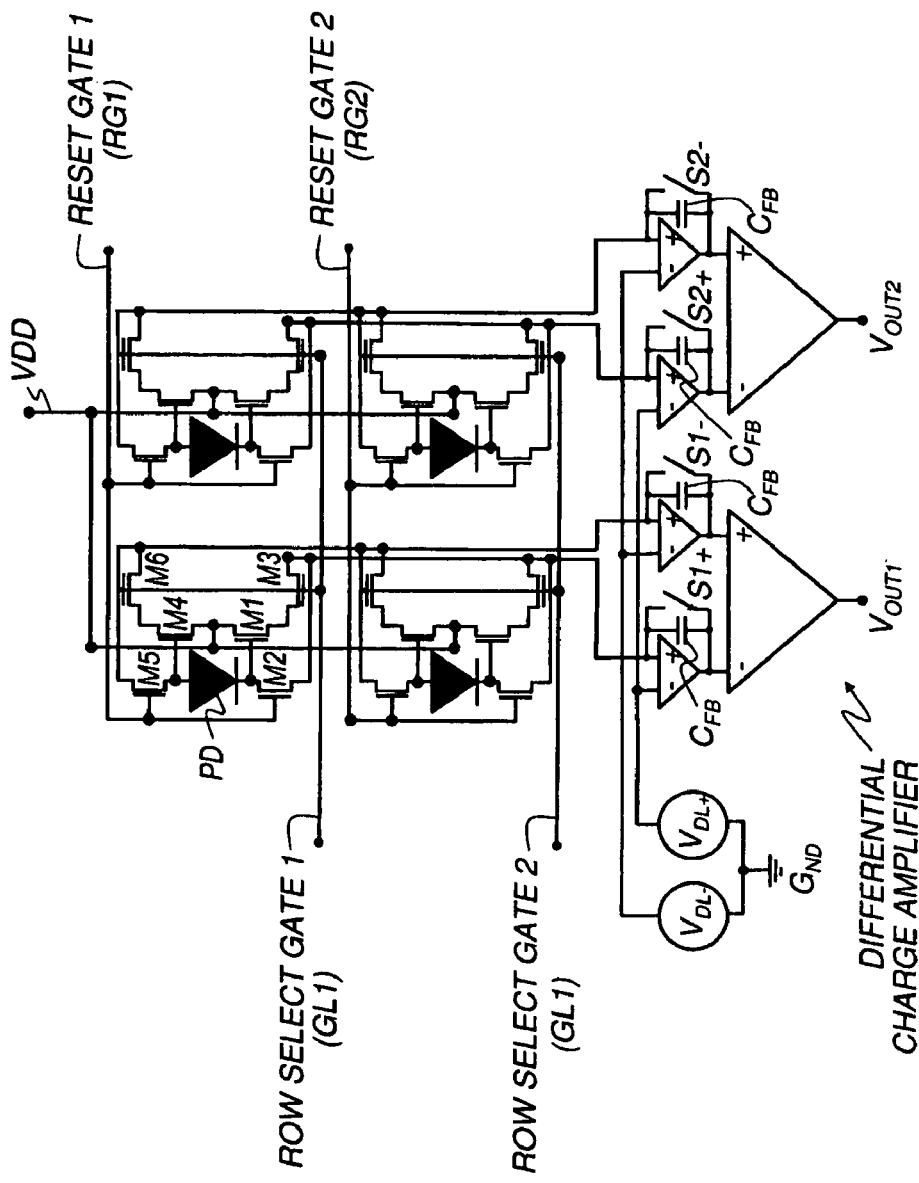
FIG. 8 is a schematic diagram showing an embodiment for an active pixel architecture in which the same lines are utilized for the data lines and the reset bias lines.

A variation of the architecture of FIG. 7 is shown in FIG. 8. In the active pixel architecture of FIG. 8, the same lines are utilized for the data lines and the reset bias lines. Since the reset operation is performed at a different time than the sense operation, there is no contention between the two operations. The operation of the architecture shown in FIG. 8 may be understood as follows. Prior to signal integration, the reset transistors M3, M6 are turned on in order to reset the voltage of the two terminals on the photosensor by connecting the two terminals of the photosensor to the respective data lines. During this period the switches S1, S2 on the column amplifiers are closed and the biases VDL+, VDL− are set to the bias levels desired on the two terminals of the photosensor. After the bias level on the photosensors has been set, the reset transistors are turned off. During exposure, photo-current discharges the photodiode, causing the voltage difference between the two terminals to decrease. In order to read-out the image, the biases VDL+, VDL− are set to the bias levels desired on the data lines for operation of the pixel amplifier. The row select lines are scanned by sequentially turning on each of the row select gates in succession. When the row select line, also called a gate line, in a particular row is turned on, both row select transistors M2, M5 are turned on at the same time, coupling one terminal of each of the amplifier transistors M1, M4 to their respective data lines. In this embodiment, current will flow in each of the data lines proportional to the gate voltage on the amplifier transistors M1, M4. The charge amplifiers for each of the data lines integrate the currents on their respective feedback capacitors over the time period that the row select transistor is on. The difference in the output voltage of the two charge amplifiers is thus proportional to the difference in currents in the two data lines and thereby to the difference in voltages on the gates of the amplifier transistors M1, M4. It will be recognized by one experienced in the art that other column amplifier designs, such as a current mirror, can be used to convert the current signal on the data line to an output voltage.

It will be recognized by one skilled in the art that other pixel amplifier circuit designs may be substituted for the basic three-transistor pixel amplifier. For example, some prior art pixel amplifiers utilize four transistors rather than three transistors. The fourth transistor is used as a transfer gate between one terminal of the photodiode and the amplifier transistor. A variation of this design is the so-called shared transistor architecture, in which the four photosensors share the same amplifier transistor and row select transistor. In this design the transfer gate transistors for the four photosensors are turned on in series in order to sequentially couple each of the respective photosensors to the single amplifier transistor. These more advanced architectures also suffer from the disadvantages of the single-ended design discussed previously. Connecting each of the two terminals of the photosensor to separate pixel amplifiers, which are then coupled to separate data lines through parallel row-select transistors, can mitigate these disadvantages as discussed previously.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention. For example, the electrically isolated photosensors, shown as PIN diodes, could also be some other type of sensor component, including p-n junction photodiodes, p-i-n photodiodes, MOS photocapacitors, MIS photosensors, and photoconductors. Photosensors themselves can be formed from one or more of amorphous silicon, amorphous silicon-carbide, polycrystalline silicon, silicon-germanium, metal oxide semiconductors such as ZnO, organic semiconductor material, or crystalline silicon. One or more of the switching elements, transistors M1, M2, M3, M4, M5 or M6 could be thin-film transistors (TFTs) or similar components.

Thus, what is provided is an imaging array using differential readout components to take advantage of common-mode noise detection for improved image signal quality.

PARTS LIST

10. Pixel
34. Readout chip
40. PIN photodiode
42. Insulator
44, 45. Doped region
70. Photodiode
71. TFT switch
80. Flat panel imager
81. Sensor array
82. Driver chip
83. Gate lines
84. Data line
85. Bias line
86. Amplifier 87. Multiplexer
88. A-D converter
180. Electrode
181, 186, 190. Insulator
182a, 182b, 182c. Interconnect
188. Data line
AMP2, AMP3, AMP4, AMP5. Amplifier
DL+, DL−. Data line
GL1, GL2. Line
M1, M2, M3, M4, M5, M6. Switching element
PD. Photosensor
SCAN1, SCAN2, Reset. Signal

The invention claimed is:

1. A light sensing array comprising:
    a plurality of electrically isolated photo sensors, each photosensor comprising a first terminal and a second terminal, each of the terminals of each photosensor being isolated from the terminals of the other photosensors, wherein each photosensor responds to an incident light level by producing a charge difference between the first and second terminal; and
    a differential circuit selectively coupled to the first and second terminals of one of the photosensors for producing an output signal related to the charge difference between the first and second terminals.

2. The light sensing array of claim 1 further comprising a charge readout circuit corresponding to each photosensor, wherein the charge readout circuit comprises:
    a first switching element responsive to a scan signal by connecting the first terminal to a first data line; and
    a second switching element responsive to the scan signal by connecting the second terminal to a second data line.

3. The light sensing array of claim 2, in which switching signals applied to the first and second switching elements combine with signals from the photosensor during readout, and the differential charge sensing circuit discriminates between these signals and the charge level.

4. The light sensing array of claim 2, further comprising a differential charge amplifier that produces an output signal in response to a difference in charge between the first and second data lines.

5. The light sensing array of claim 4, wherein the differential charge amplifier further comprises a circuitry to apply a difference in voltage between the first data line and the second data line.

6. The light sensing array according to claim 2 further comprising a scan terminal capacitively coupled to at least one of the first data line and the second data line.

7. The light sensing array of claim 6, further comprising first and second scan terminals capacitively coupled to the first data line and the second data line, wherein signals on the first and second scan terminals are coupled to the data lines in substantially the same manner such that the differential readout substantially eliminates a switching signal from outputs of the first data line and the second data line.

8. The array of claim 2, wherein at least one of the first switching element and the second switching element comprises a thin film transistor.

9. The light sensing array of claim 1 wherein each of the plurality of photosensors is selected from the group consisting of p-n junction photodiodes, p-i-n photodiodes, MOS photocapacitors, MIS photosensors, and photoconductors.

10. The light sensing array of claim 9 wherein at least one of the photosensors comprises one or more of amorphous silicon, amorphous silicon-carbide, polycrystalline silicon, silicon-germanium, organic semiconductor material, or crystalline silicon.

11. The light sensing array of claim 1 wherein the first and second terminals of a first photo sensor and the first and second terminals of a second photosensor are selectively coupled to a single pair of data lines.

12. The light sensing array of claim 11 further comprising a charge readout circuit for the first and second photo sensors, the charge readout circuit selectively coupling a selected one of the first and second photosensors to the data lines at a time.

13. The light sensing array of claim 12 wherein the charge readout circuit comprises:
    first and second switching elements responsive to a first scan signal to respectively connect the first and second terminals of the first photosensor to the first and second data lines; and
    third and fourth switching elements responsive to a second scan signal to respectively connect the first and second terminals of the second photosensor to the first and second data lines.

14. A light sensing array comprising:
    a plurality of photosensors, each photosensor comprising a first terminal and a second terminal,
    a signal sensing circuit corresponding to each photo sensor, wherein the signal sensing circuit comprises:
    (i) a first amplifier connected to the first terminal;
    (ii) a first switch responsive to a scan signal to connect the first amplifier to a first data line;
    (iii) a second amplifier connected to the second terminal; and
    (iv) a second switching element responsive to a scan signal to connect the second amplifier signal to a second data line; and
    a differential circuit for sensing the difference between signal levels on the first data line and the second data line.

15. The light sensing array of claim 14 further comprising a first reset switching element for switching the first terminal to a first reset voltage level and a second reset switching element for switching the second terminal to a second reset voltage level.

16. The light sensing array of claim 15 wherein the first reset switching element and the second reset switching element are connected to the first data line and the second data line.

17. The light sensing array of claim 14, wherein the signal sensing circuit is responsive to first and second voltages on the first and second terminals and the first and second amplifiers convert the first and second voltages to first and second currents respectively.

18. The light sensing array of claim 14, wherein the differential circuit for sensing the difference between signal levels on the first data line and the second data line comprises a first current sensitive amplifier and a second current sensitive amplifier connected to the first data line and the second data line.

19. The light sensing array of claim 14, wherein the differential circuit for sensing the difference between signal levels on the first data line and the second data line comprises charge amplifiers.

20. The light sensing array of claim 14, wherein at least one of the first amplifier and the second amplifier comprises a thin film transistor.

21. The light sensing array of claim 14, wherein the differential circuit for sensing the difference between signal levels on the first data line and the second data line comprises a thin film transistor.

22. The light sensing array of claim 14, in which the first and second amplifiers of first and second photo sensors are selectively coupled to a single pair of data lines.

23. The light sensing array of claim 22, further comprising a charge readout circuit for each of the first and second photosensors, the charge readout circuit selectively coupling a selected one of the first and second amplifiers of the first and second photosensors to the first data line and the second data line at a time.

24. A light sensing array comprising:

a front plane comprising a plurality of photosensor pairs, each photosensor in the photosensor pair comprising a first terminal and a second terminal, wherein each photosensor corresponds to an image pixel and wherein each photosensor responds to an incident light level by forming a charge between the first and second terminal according to the incident light level;

a differential amplifier corresponding to each photosensor pair, wherein the differential amplifier has first and second data lines; and first and second charge sensing circuits corresponding to each differential amplifier, wherein each charge sensing circuit comprises:

(i) a first amplifier providing a first output signal varying with the charge level at the first terminal;

(ii) a first switch responsive to a scan signal to couple the first output signal to the first data line;

(iii) a first reset switch for switching the first terminal to a first reset voltage level;

(iv) a second amplifier providing a second output signal varying with the charge level at the second terminal;

(v) a second switch responsive to a scan signal to couple the second output signal to the second data line; and (vi) a second reset switch for switching the second terminal to a reset voltage level.

25. A method of operation of the light sensing array of claim 24, comprising, for each of the scan lines:

obtaining a first sample of the output signal of the differential charge amplifier prior to the start of the scan signal connecting the first and second terminals of the photosensor to the first and second data lines;

obtaining a second sample of the output signal of the differential charge amplifier after the scan signal connects the first and second terminals of the photosensor to the first and second data lines; and subtracting the first and second samples.

* * * * *